United States Patent
Kang et al.

(10) Patent No.: US 11,838,514 B2
(45) Date of Patent: Dec. 5, 2023

(54) IMAGE ENCODING/DECODING METHOD AND DEVICE, AND RECORDING MEDIUM STORING BITSTREAM

(71) Applicants: Electronics and Telecommunications Research Institute, Daejeon (KR); UNIVERSITY-INDUSTRY COOPERATION GROUP OF KYUNG HEE UNIVERSITY, Yongin-si (KR)

(72) Inventors: Jung Won Kang, Daejeon (KR); Ha Hyun Lee, Seoul (KR); Sung Chang Lim, Daejeon (KR); Jin Ho Lee, Daejeon (KR); Hui Yong Kim, Daejeon (KR); Gwang Hoon Park, Seongnam-si (KR); Tae Hyun Kim, Hwaseong-si (KR); Dae Young Lee, Ansan-si (KR)

(73) Assignees: Electronics and Telecommunications Research Institute, Daejeon (KR); UNIVERSITY-INDUSTRY COOPERATION GROUP OF KYUNG HEE UNIVERSITY, Gyeonggi-do (KR)

( * ) Notice: Subject to any disclaimer, the term of this patent is extended or adjusted under 35 U.S.C. 154(b) by 202 days.

(21) Appl. No.: 17/266,540

(22) PCT Filed: Aug. 6, 2019

(86) PCT No.: PCT/KR2019/009780
§ 371 (c)(1),
(2) Date: Feb. 5, 2021

(87) PCT Pub. No.: WO2020/032531
PCT Pub. Date: Feb. 13, 2020

(65) Prior Publication Data
US 2021/0306638 A1 Sep. 30, 2021

(30) Foreign Application Priority Data

Aug. 6, 2018 (KR) .......................... 10-2018-0091365
Sep. 21, 2018 (KR) .......................... 10-2018-0113484

(51) Int. Cl.
*H04N 19/105* (2014.01)
*H04N 19/176* (2014.01)
(Continued)

(52) U.S. Cl.
CPC ......... *H04N 19/137* (2014.11); *H04N 19/105* (2014.11); *H04N 19/176* (2014.11); *H04N 19/1883* (2014.11)

(58) Field of Classification Search
CPC .......................... H04N 19/137; H04N 19/105
See application file for complete search history.

(56) References Cited

U.S. PATENT DOCUMENTS

| 2014/0010283 A1 | 1/2014 | Lim et al. |
| 2014/0010287 A1* | 1/2014 | Wahadaniah ........ H04N 19/513 375/240.02 |

(Continued)

FOREIGN PATENT DOCUMENTS

| KR | 100772576 B1 | 11/2007 |
| KR | 1020150088909 A | 8/2015 |

(Continued)

*Primary Examiner* — Irfan Habib
(74) *Attorney, Agent, or Firm* — William Park & Associates Ltd.

(57) ABSTRACT

The present invention discloses an image decoding method, the method including generating a candidate list including motion information derived from a spatial neighboring block and a temporal neighboring block adjacent to a current block; deriving motion information of the current block using the candidate list; generating a prediction block of the current block using the derived motion information; and updating the derived motion information in a motion infor- (Continued)

mation list, wherein the generating of the candidate list is performed in such a manner as to include at least one information of the motion information included in the updated motion information list in a block decoded before the current block.

16 Claims, 25 Drawing Sheets

(51) Int. Cl.
   *H04N 19/169* (2014.01)
   *H04N 19/137* (2014.01)

(56) References Cited

U.S. PATENT DOCUMENTS

| | | | | |
|---|---|---|---|---|
| 2014/0376634 A1* | 12/2014 | Guo | ................. | H04N 19/154 375/240.16 |
| 2015/0063440 A1* | 3/2015 | Pang | ................. | H04N 19/61 375/240.02 |
| 2015/0063454 A1* | 3/2015 | Guo | ................. | H04N 19/176 375/240.12 |
| 2015/0071357 A1* | 3/2015 | Pang | ................. | H04N 19/563 375/240.16 |
| 2015/0271487 A1* | 9/2015 | Li | ................. | H04N 19/58 375/240.02 |
| 2015/0281726 A1* | 10/2015 | Chono | ................. | H04N 19/147 375/240.16 |
| 2016/0057420 A1* | 2/2016 | Pang | ................. | H04N 19/176 375/240.16 |
| 2016/0105670 A1* | 4/2016 | Pang | ................. | H04N 19/70 375/240.16 |
| 2017/0105000 A1* | 4/2017 | Nishitani | ................. | H04N 19/139 |
| 2018/0109805 A1 | 4/2018 | Takehara et al. | | |
| 2019/0200040 A1* | 6/2019 | Lim | ................. | H04N 19/96 |
| 2019/0320196 A1* | 10/2019 | Yu | ................. | H04N 19/423 |
| 2020/0137398 A1* | 4/2020 | Zhao | ................. | H04N 19/159 |
| 2020/0244978 A1* | 7/2020 | Li | ................. | H04N 19/52 |
| 2020/0413045 A1* | 12/2020 | Zhang | ................. | H04N 19/137 |
| 2021/0037238 A1* | 2/2021 | Park | ................. | H04N 19/105 |
| 2021/0266539 A1* | 8/2021 | Lee | ................. | H04N 19/119 |
| 2021/0274201 A1* | 9/2021 | Xu | ................. | H04N 19/105 |
| 2021/0274202 A1* | 9/2021 | Xu | ................. | H04N 19/423 |
| 2022/0038682 A1* | 2/2022 | Lim | ................. | H04N 19/176 |
| 2022/0038686 A1* | 2/2022 | Solovyev | ................. | H04N 19/176 |
| 2022/0103810 A1* | 3/2022 | Park | ................. | H04N 19/132 |
| 2022/0103828 A1* | 3/2022 | Zhang | ................. | H04N 19/52 |
| 2022/0116588 A1* | 4/2022 | Moon | ................. | H04N 19/159 |
| 2022/0182606 A1* | 6/2022 | Park | ................. | H04N 19/513 |
| 2022/0286689 A1* | 9/2022 | Nam | ................. | H04N 19/54 |
| 2022/0368891 A1* | 11/2022 | Park | ................. | H04N 19/137 |
| 2023/0019459 A1* | 1/2023 | Xu | ................. | H04N 19/137 |

FOREIGN PATENT DOCUMENTS

| | | |
|---|---|---|
| KR | 101721345 B1 | 3/2017 |
| KR | 1020180007345 A | 1/2018 |
| KR | 1020180082414 A | 7/2018 |
| RU | 2566955 C9 | 10/2015 |
| WO | 2001086962 A1 | 11/2001 |
| WO | 2013001803 A1 | 1/2013 |
| WO | 2014073173 A1 | 5/2014 |
| WO | 2018012886 A1 | 1/2018 |
| WO | 2018105757 A1 | 6/2018 |

\* cited by examiner

FIG. 15

| | Descriptor |
|---|---|
| seq_parameter_set_rbsp( ) { | |
|   sps_seq_parameter_set_id | ue(v) |
|   ... | |
|   amvol_enable_flag | u(1) |
|   if( amvol_enable_flag ) { | |
|     ... | |
|     amvol_prediction_flag | u(1) |
|     ... | |
|   } | |
|   ... | |
| } | |

FIG. 16

| | Descriptor |
|---|---|
| pic_parameter_set_rbsp( ) { | |
| pps_pic_parameter_set_id | ue(v) |
| pps_seq_parameter_set_id | ue(v) |
| ... | |
| amvol_enable_flag | u(1) |
| if( amvol_enable_flag ) { | |
| amvol_prediction_flag | u(1) |
| ... | |
| } | |
| ... | |
| } | |

FIG. 17

| | Descriptor |
|---|---|
| slice_header( ) { | |
| slice_pic_parameter_set_id | ue(v) |
| slice_address | u(v) |
| slice_type | ue(v) |
| if ( slice_type != I ) { | |
| log2_diff_ctu_max_bt_size | ue(v) |
| ... | |
| amvol_enable_flag | u(1) |
| if( amvol_enable_flag ) { | |
| ... | |
| amvol_prediction_flag | u(1) |
| ... | |
| } | |
| ... | |
| } | |

Collocated CTU

IMAGE ENCODING/DECODING METHOD AND DEVICE, AND RECORDING MEDIUM STORING BITSTREAM

TECHNICAL FIELD

The present invention relates to a method and apparatus for encoding/decoding an image and a recording medium for storing a bitstream. More particularly, the present invention relates to a method and apparatus for encoding/decoding an image, which uses a motion information list storing pre-reconstructed motion information.

BACKGROUND ART

Recently, demands for high resolution and high quality images such as high definition (HD) images and ultra-high definition (UHD) images are increasing in various application fields. As the image data becomes high resolution and high quality, the amount of data increases relative to the existing image data. Therefore, when image data is transmitted using a medium such as a wired/wireless broadband line or stored using a storage medium in the related art, transmission and storage costs increase. In order to solve these problems caused as the image data becomes high resolution and high quality, a high efficiency image encoding/decoding technique is required for an image having a higher resolution and quality.

As the image compression technique, various techniques exist, such as an inter prediction technique for predicting pixel values included in a current picture from a picture before or after the current picture, an intra prediction technique for predicting pixel values included in the current picture by using pixel information in the current picture, and a transforming and quantizing technique for compressing the energy of the residual signal, and an entropy encoding technique for allocating a short code to a value having a high frequency of occurrence and a long code to a value having a low frequency of occurrence. Such image compression technologies can be used to effectively compress and transmit or store image data.

DISCLOSURE

Technical Problem

An objective of the present invention is to provide a method and apparatus for encoding and decoding an image, and a recording medium storing a bitstream, which improve compression efficiency by using a motion information list storing pre-reconstructed motion information.

Technical Solution

A method of decoding an image according to an embodiment of the present invention, the method may comprise generating a candidate list including motion information derived from a spatial neighboring block and a temporal neighboring block adjacent to a current block, deriving motion information of the current block by using the candidate list, generating a prediction block of the current block using the derived motion information, updating the derived motion information in a motion information list and wherein the generating of the candidate list is performed in such a manner as to include at least one of the motion information included in the updated motion information list in a block, which is decoded before the current block.

In the method of decoding an image according to the present invention, wherein the motion information list is initialized when decoding of a predetermined region is completed so that the region is changed.

In the method of decoding an image according to the present invention, wherein the predetermined region is any one of a block composed of one or more coding units (CUs) or a block composing of one or more coding tree units (CTUs).

In the method of decoding an image according to the present invention, wherein when there is a plurality of motion information in the updated motion information list in the block decoded before the current block, the generating of the candidate list is performed in such a manner as to include an average of at least two or more motion information of the plurality of motion information in the candidate list.

In the method of decoding an image according to the present invention, wherein when the motion information of the updated motion information list in the block decoded before the current block is the same as the motion information previously included in the candidate list, the generating of the candidate list is performed in such a manner as not to include the motion information of the motion information list in the candidate list.

In the method of decoding an image according to the present invention, wherein when the current block is an IBC prediction mode and the candidate list is a shared merge list, the updating of the derived motion information in the motion information list is omitted.

In the method of decoding an image according to the present invention, wherein the motion information list has a limitation of a predetermined size.

In the method of decoding an image according to the present invention, wherein when the number of motion information stored in the motion information list is a predetermined value, the updating of the derived motion information in the motion information list includes deleting the motion information first stored in the motion information list and storing the derived motion information.

A method of encoding an image according to an embodiment of the present invention, the method may comprise generating candidate list including motion information derived from spatial neighboring block and temporal neighboring block adjacent to current block, deriving motion information of the current block by using the candidate list, generating prediction block of the current block using the derived motion information, updating the derived motion information in motion information list and wherein the generating candidate list is performed in such a manner as to be include at least one of motion information included in the updated motion information list in a block, which is encoded before the current block.

In the method of encoding an image according to the present invention, wherein the motion information list is initialized when encoding of a predetermined region is completed so that the region is changed.

In the method of encoding an image according to the present invention, wherein the predetermined region is any one of a block composed of one or more coding units (CUs) or a block composing of one or more coding tree units (CTUs).

In the method of encoding an image according to the present invention, wherein when there is a plurality of motion information in the updated motion information list in the block encoded before the current block, the generating of the candidate list is performed in such a manner as to include an average of at least two or more motion information of the plurality of motion information in the candidate list.

In the method of encoding an image according to the present invention, wherein when the motion information of the updated motion information list in the block encoded before the current block is the same as the motion information previously included in the candidate list, the generating of the candidate list is performed in such a manner as not to include the motion information of the motion information list in the candidate list.

In the method of encoding an image according to the present invention, wherein when the current block is an IBC prediction mode and the candidate list is a shared merge list, the updating of the derived motion information in the motion information list is omitted.

In the method of encoding an image according to the present invention, wherein the motion information list has a limitation of a predetermined size.

In the method of encoding an image according to the present invention, wherein when the number of motion information stored in the motion information list is a predetermined value, the updating of the derived motion information in the motion information list includes deleting the motion information first stored in the motion information list and storing the derived motion information.

In a non-transitory computer-readable recording medium comprising bitstream decoded by a method of decoding an image according to an embodiment of the present invention, the method of decoding an image may comprise generating candidate list including motion information derived from spatial neighboring block and temporal neighboring block adjacent to current block, deriving motion information of current block by using the candidate list, generating prediction block of current block using the derived motion information, updating the derived motion information in motion information list and wherein the generating of the candidate list is performed in such a manner as to include at least one information of the motion information included in the updated motion information list in a block decoded before the current block.

Advantageous Effects

The present invention can provide a method and apparatus for encoding and decoding an image, and a recording medium storing a bitstream which improve compression efficiency by using a motion information list storing pre-reconstructed motion information.

According to the present invention, when there is little or no motion information in the motion information list storing pre-reconstructed motion information, the prediction information may be stored in the motion information list and be used to more accurately perform inter prediction.

According to the present invention, it is possible to improve encoding and decoding efficiency of an image.

According to the present invention, it is possible to reduce the computational complexity of an encoder and a decoder of an image.

DESCRIPTION OF DRAWINGS

FIG. 15 is a diagram illustrating an embodiment of performing signaling, including an indicator indicating whether to apply a motion information list to a sequence parameter set (SPS) syntax.

FIG. 16 is a diagram illustrating an embodiment of performing signaling, including an indicator indicating whether to apply a motion information list to a picture parameter set (PPS) syntax.

FIG. 17 is a diagram illustrating an embodiment of performing signaling, including an indicator indicating whether to apply a motion information list to a slice header syntax.

MODE FOR INVENTION

Figure 1:
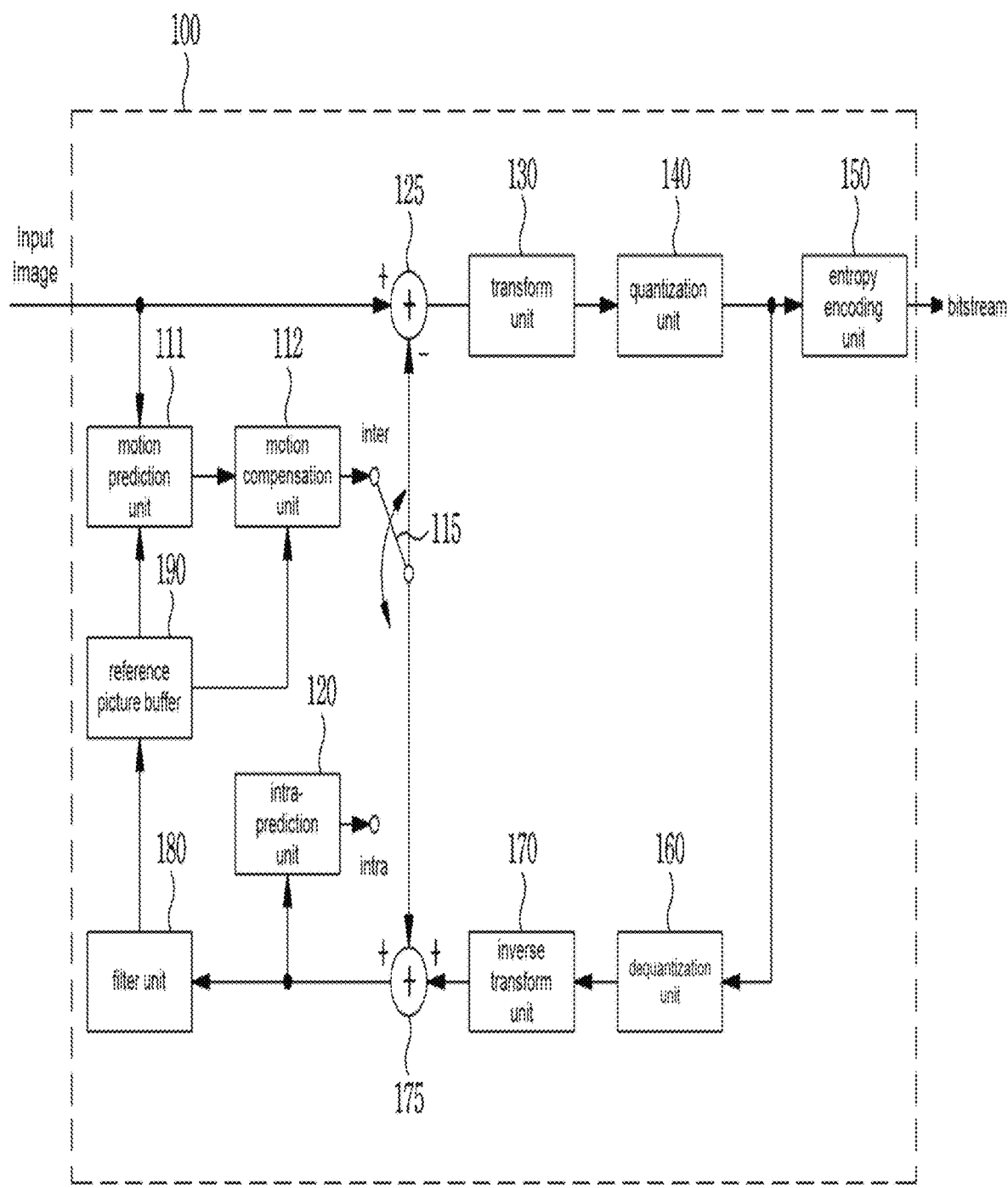
FIG. 1 is a block diagram illustrating a configuration of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. Various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture" and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd-1}$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block, a prediction unit, a prediction block, a residual unit, a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of coding blocks and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

Parsing: may mean determination of a value of a syntax element by performing entropy decoding or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list: may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator: may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag: indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index: may refer to an index indicating a specific reference picture in a reference picture list.

Reference picture: may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector: may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range: may be a two-dimensional region which is searched to retrieve a motion vector during inter prediction. For example, the size of the search range may be M×N. Here, M and N are both integers.

Motion vector candidate: may refer to a prediction candidate block or a motion vector of the prediction candidate block when predicting a motion vector. In addition, a motion vector candidate may be included in a motion vector candidate list.

Motion vector candidate list: may mean a list composed of one or more motion vector candidates.

Motion vector candidate index: may mean an indicator indicating a motion vector candidate in a motion vector candidate list. Alternatively, it may be an index of a motion vector predictor.

Motion information: may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list: may mean a list composed of one or more merge candidates.

Merge candidate: may mean a spatial merge candidate, a temporal merge candidate, a combined merge candidate, a combined bi-predictive merge candidate, or a zero-merge candidate. The merge candidate may include motion information such as a reference picture index for each list, a motion vector, a prediction list utilization flag, and an inter prediction indicator.

Merge index: may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
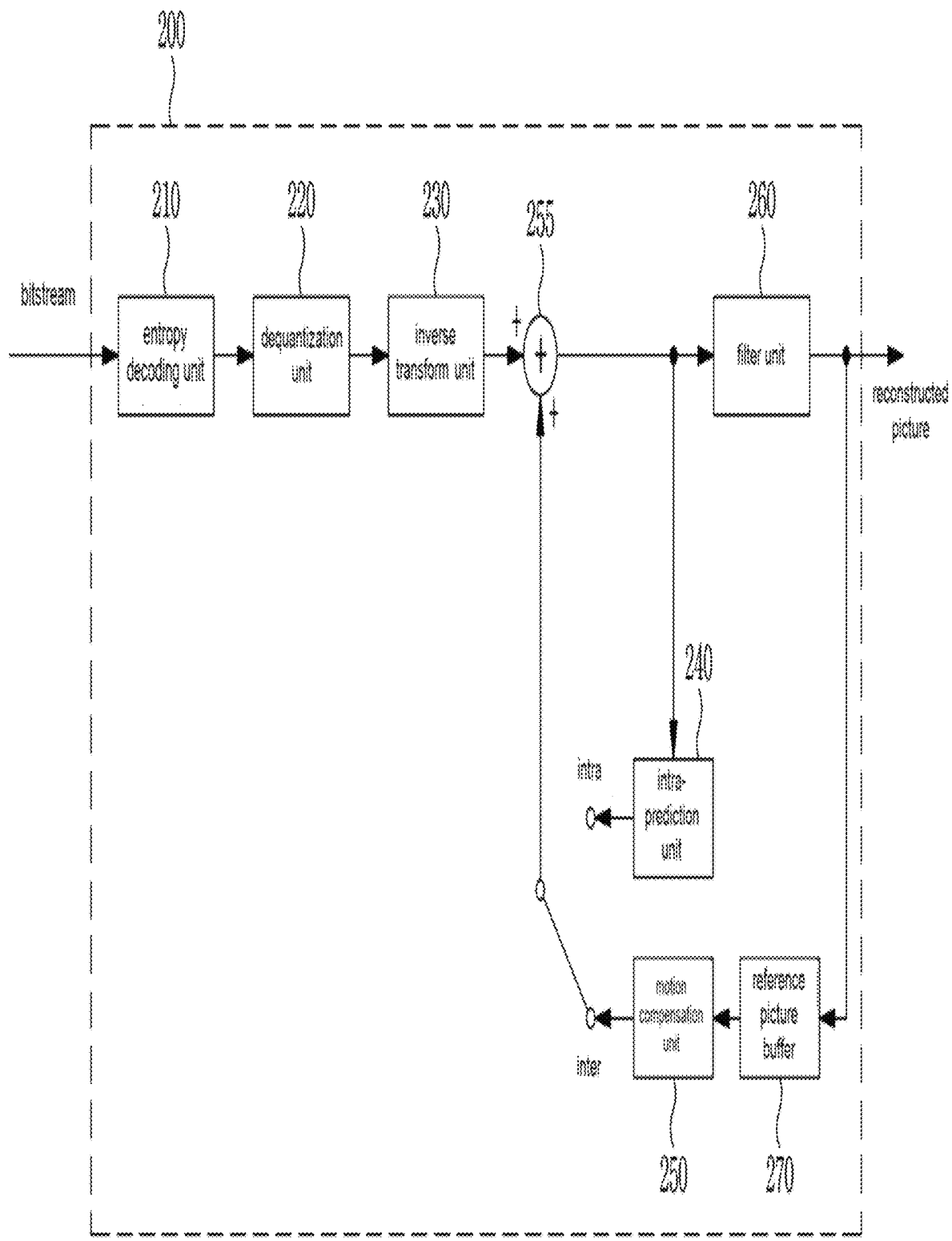
FIG. 2 is a block diagram illustrating a configuration of a decoding apparatus according to an embodiment of the present invention.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
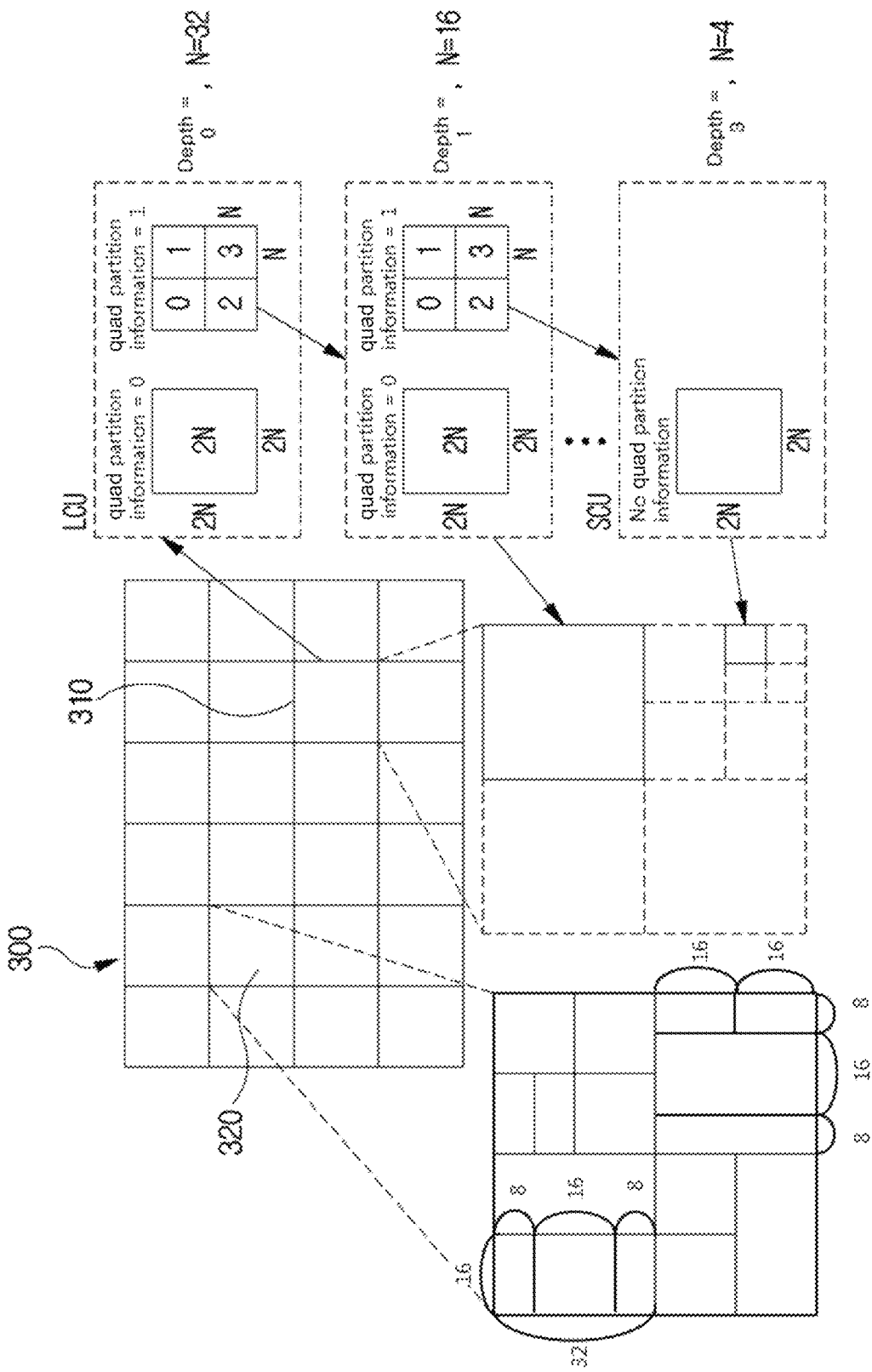
FIG. 3 is a diagram schematically illustrating a division structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction information, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
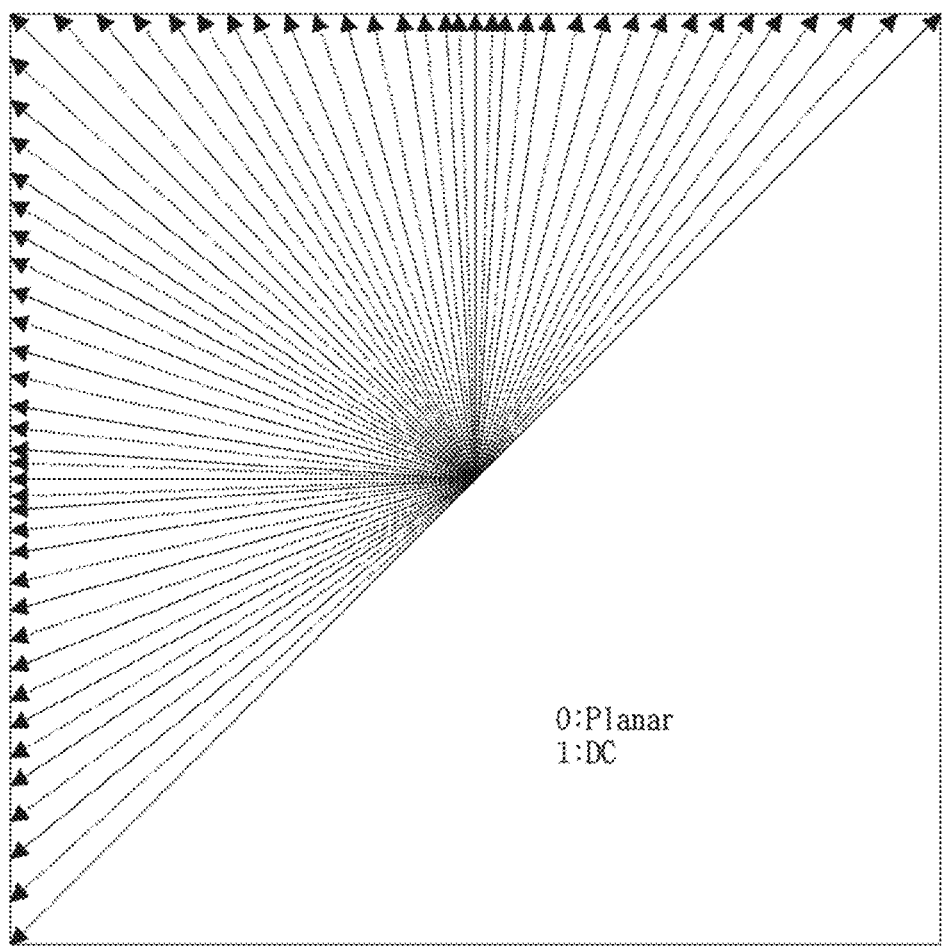
FIG. 4 is a diagram illustrating an embodiment of an intra prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
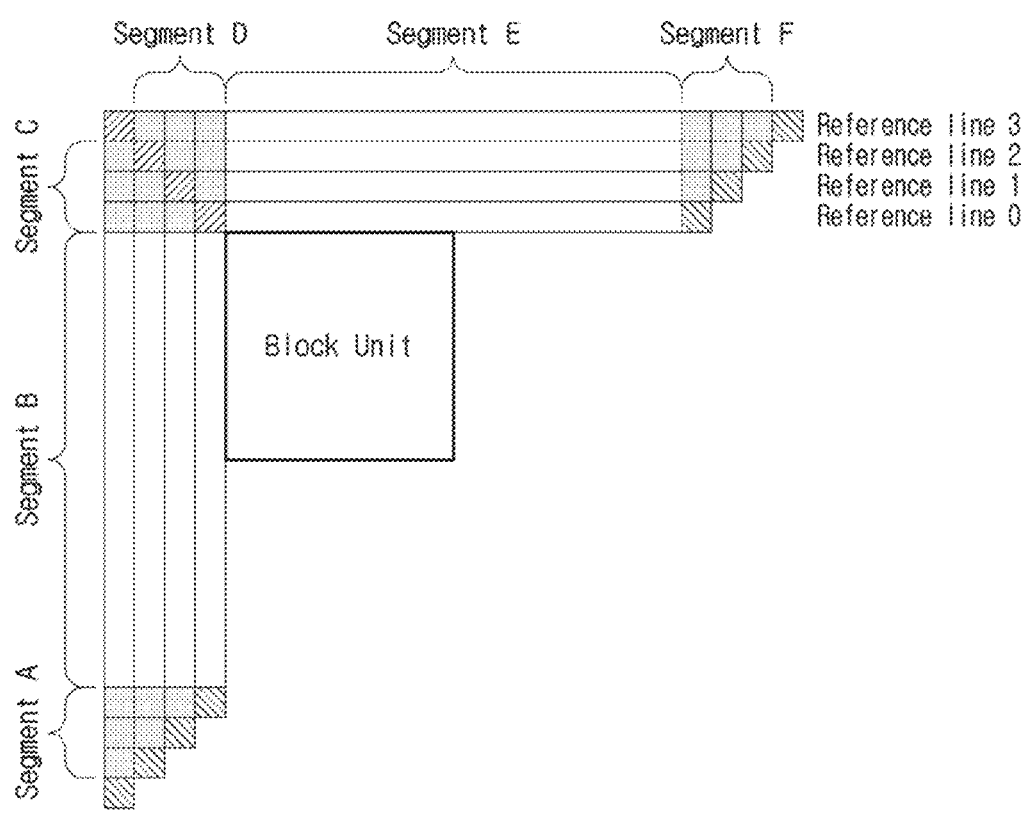
FIG. 7 is a diagram illustrating reference samples available for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
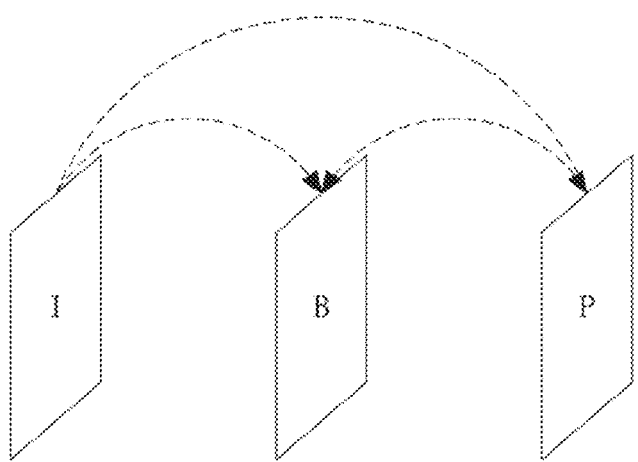
FIG. 5 is a diagram illustrating an embodiment of an inter prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are present in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the motion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current block may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information existing in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
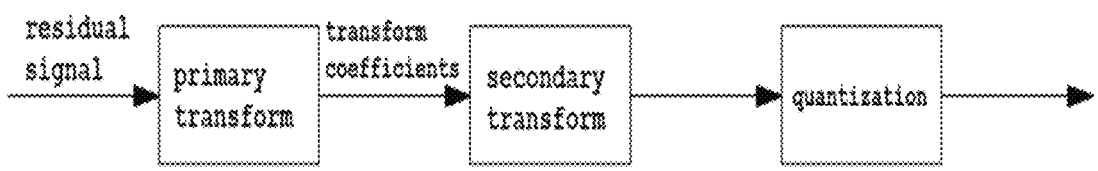
FIG. 6 is a diagram illustrating a process of transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, a method of generating a motion information list according to an embodiment of the present invention will be described.

Hereinafter, the motion information list may refer to a list in which motion information generated in image encoding or decoding is stored.

According to an embodiment of the present invention, motion information generated in inter prediction may be stored in the motion information list, and the motion information may be generated using the motion information list in inter prediction of a next encoding/decoding target block.

Here, the motion information may mean at least one of a motion vector, a reference picture index, an inter prediction indicator as described above, as well as a prediction list utilization flag, reference picture list information, reference picture, motion vector candidate, motion vector candidate index, merge candidate, merge index, and the like.

The motion information list may store motion information generated within a predetermined region.

As an example, the motion information list may be initialized by deleting the motion information of the motion information list or generating a new motion information list when encoding/decoding is completed in the predetermined region so that the area is changed.

That is, the motion information list may be generated on the basis of the predetermined region (or a predetermined section, a predetermined unit). Here, the predetermined region related to the motion information list may be a unit larger than a unit in which inter prediction is performed.

As an example, the predetermined region related to the motion information list may be any one of a block composed of one or more CUs, a CTU, a block composed of one or more CTUs (for example, a CTU row), a brick, a tile, a slice, a picture, a frame, and a group of pictures (GOP).

The predetermined region associated with the motion information list may be referred to as an upper prediction unit (UPU) or an initialization region.

Meanwhile, the motion information list may be referred to as an adaptive motion vector occurrence list (AMVOL) or a history based motion vector predictor list (HMVP list) according to an embodiment.

Meanwhile, the motion information list may be used only when the encoder/decoder operates in the inter prediction mode or the IBC mode.

Figure 8:
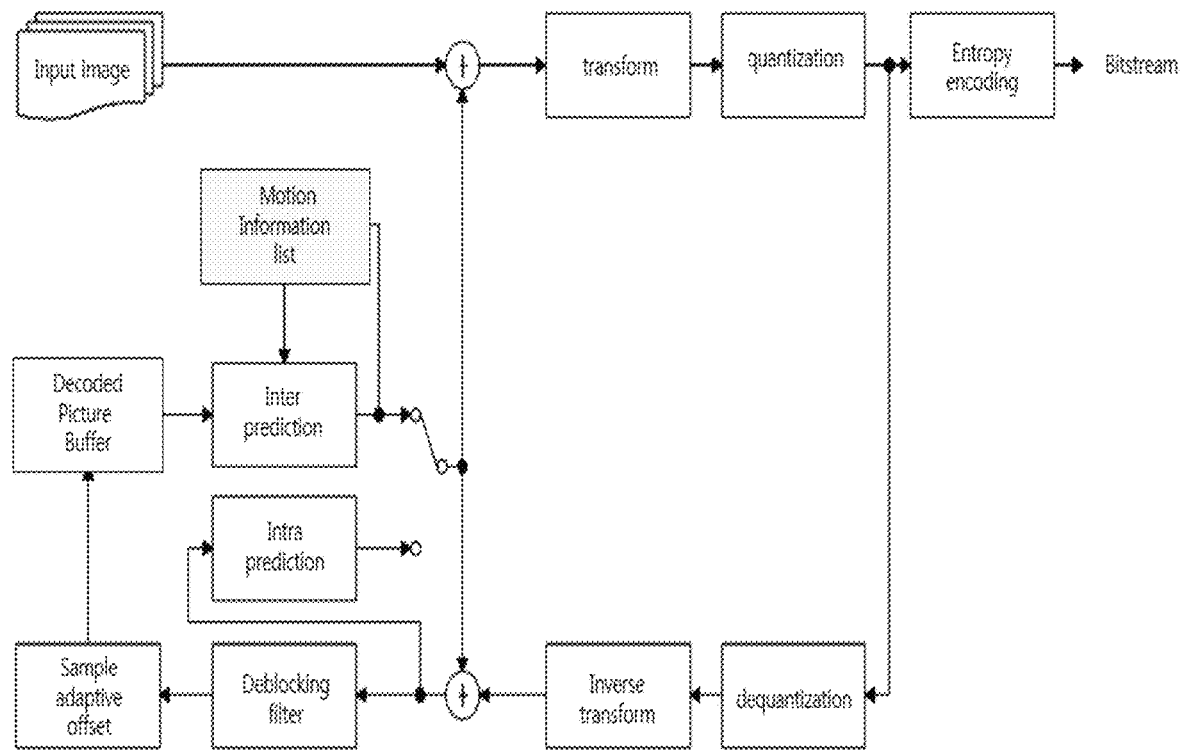
FIGS. 8 and 9 are diagrams illustrating an encoder and a decoder using a motion information list.
Figure 9:
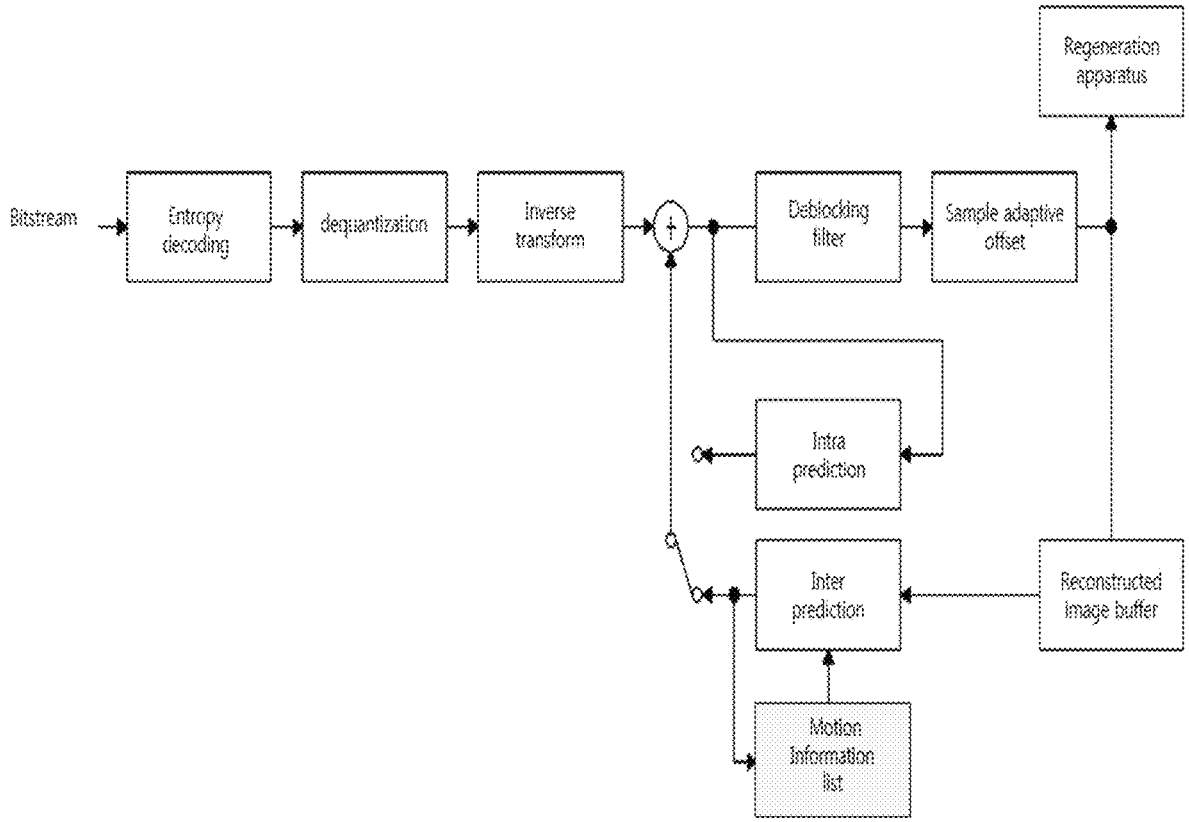

FIGS. 8 and 9 are diagrams illustrating an encoder and a decoder using a motion information list.

Referring to FIGS. 8 and 9, the encoder and the decoder may increase prediction efficiency by using motion information stored in a motion information list in an inter prediction process or an IBC prediction process.

Meanwhile, the motion information list may be initialized or generated when encoding/decoding of a new UPU starts. Therefore, when encoding/decoding of the new UPU starts, the motion information list may not have motion information because inter prediction is not performed in the new UPU. Since the motion information list does not have the motion information, the motion information list may not be used in inter prediction. In addition, when the number of motion information stored in the motion information list is small, it is difficult to expect efficient encoding because there is little information used for the inter prediction.

In the present invention, when performing inter prediction (or IBC prediction), when there is little or no motion information stored in the motion information list, a method of additionally storing the predicted motion information in the motion information list to generate a motion information list is suggested.

Through the above-described method, it is possible to improve encoding efficiency by more accurately performing inter prediction using the motion information list.

The motion information list according to the present invention may store motion information generated in the current UPU.

Figure 10:
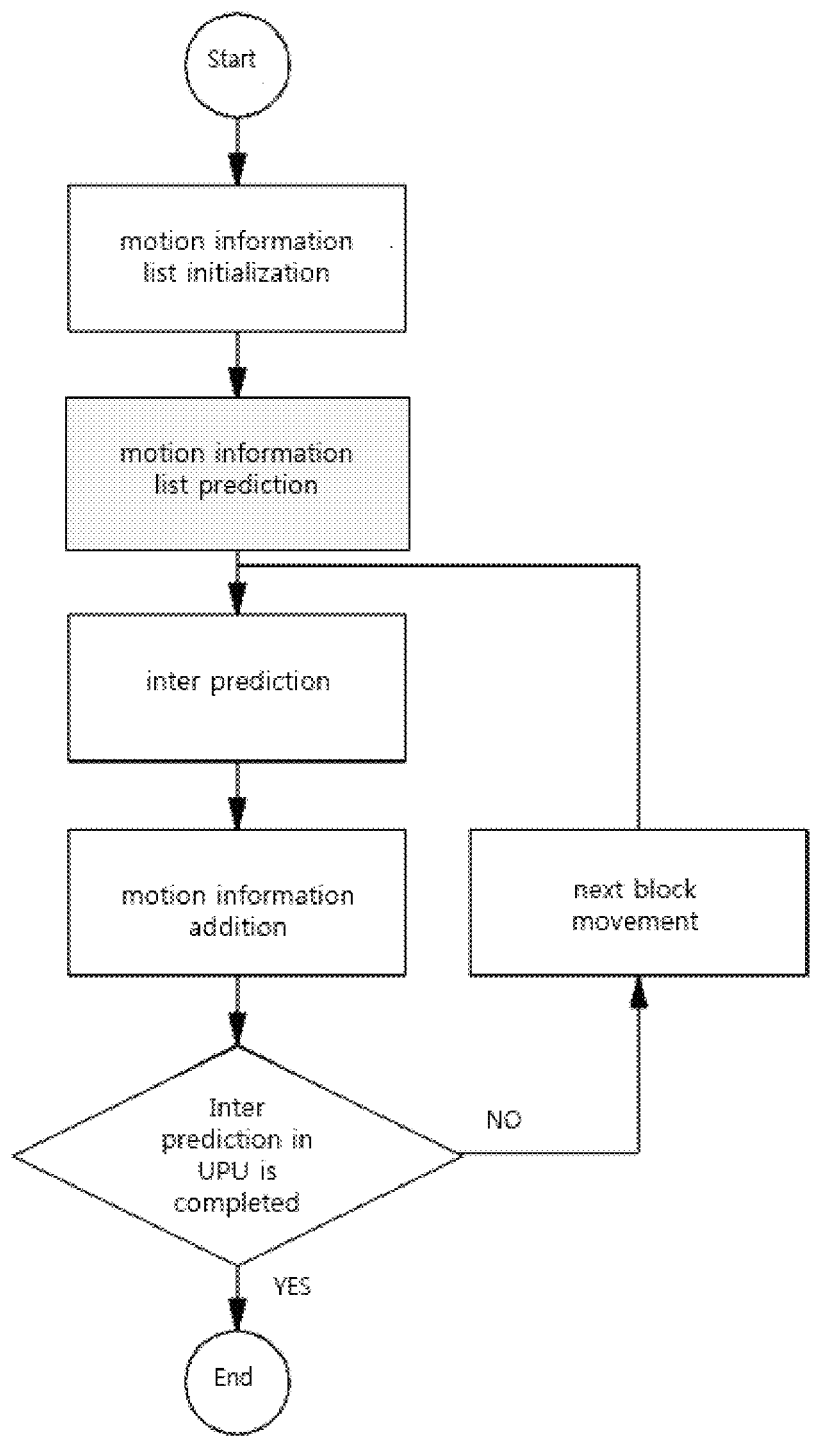
FIG. 10 is a flowchart illustrating an inter prediction method using a motion information list according to the present invention.

FIG. 10 is a flowchart illustrating an inter prediction method using a motion information list according to the present invention.

Referring to FIG. 10, when encoding/decoding of a new UPU starts, a motion information list initialization step is a step of removing all information in the motion information list or returning the same to a set default value.

A motion information list prediction step is a step of predicting motion information to be entered in the motion information list and adding the same to the motion information list.

Here, the motion information list prediction step may add a plurality of predicted motion information to the motion information list.

An inter prediction step includes a motion information prediction step, and is a step of predicting a current block through a reference picture.

A motion information addition step is a step of adding the motion information obtained as a result of the inter prediction to the motion information list. According to an embodiment, the motion information addition step may be omitted or changed. For example, when the triangle partitioning mode is performed, the motion information addition step may be omitted. That is, when the blocks resulting from partitioning in the diagonal direction share the same motion information list in the triangle partitioning mode, the motion information addition step may be omitted.

The inter prediction step and the motion information addition step may be performed in units of blocks, and may be performed for all blocks in the corresponding UPU.

After checking whether the execution is completed for all blocks in the UPU, when the execution is not completed, the process is moved to next block so that inter prediction may be performed.

When inter prediction is performed on all blocks in the UPU, and the motion information list of the UPU is no longer used, the motion information list may be initialized.

Figure 11:
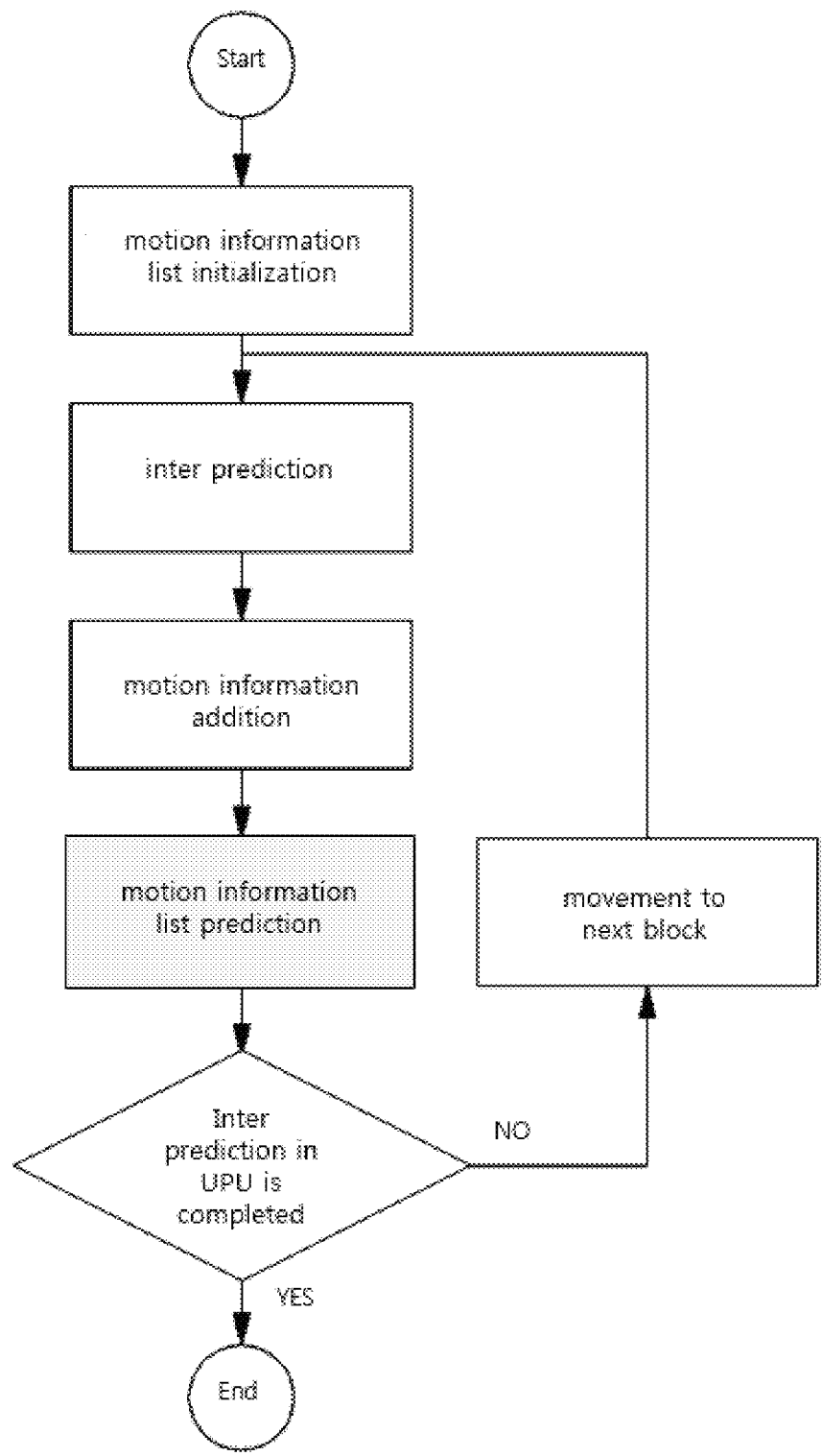
FIG. 11 is a flowchart illustrating an inter prediction method using a motion information list.

FIG. 11 is a flowchart illustrating an inter prediction method using a motion information list. The description of each step illustrated in the flowchart of FIG. 11 may be the same as the description of FIG. 10.

However, the time point at which the motion information list prediction step in FIG. 11 is performed may be different from that in FIG. 10.

In FIG. 10, the motion information list prediction step may be performed after the motion information list initialization step is performed. That is, the motion information list prediction step may be performed together with the motion information list initialization step, and thus the motion information list prediction step may be performed when the UPU is changed.

In FIG. 11, the motion information list prediction step may be performed after the motion information addition step is performed. That is, the motion information list prediction may be performed whenever motion information is added to the motion information list.

FIG. 11 differs from FIG. 10, in that additional motion information may be predicted by using motion information stored in a current motion information list.

In addition, in the case of FIG. 11, the predicted motion information may also be continuously updated or added to the motion information list by predicting more efficient candidates, but motion information list prediction is performed every block so that the amount of computation of the system may be increased.

In the flowcharts of the examples of FIGS. 10 and 11, the order of each step may be changed. When encoding/decoding a block of another UPU in a situation where encoding/decoding of the current UPU is not completed, each step in FIGS. 10 and 11 may be applied or omitted in a different order.

When there is no spatial reference relationship between blocks in a UPU boundary, such as when the UPU is a picture unit, a slice unit, or a tile unit, the encoding/decoding order may not pass between UPUs different from each other. In this case, when the encoding/decoding of the current UPU is not finished, the encoding may be performed in the same UPU even after moving to the next block.

However, when a UPU is divided into a plurality of units within the same picture, slice, or tile, a case in which a next encoding/decoding block belongs to another UPU may be generated even when encoding/decoding is not finished in the current UPU according to an encoding/decoding sequence. In this case, UPUs different from each other may have different motion information lists from each other, and encoding information of the current block may be stored in the motion information list of the UPU to which the current block belongs. In this case, the motion information list may also be predicted from the motion information list stored in the other UPU up to the present time.

Meanwhile, the motion information list prediction step may be performed at both the motion information list initialization time point and the motion information addition time point.

Figure 12:
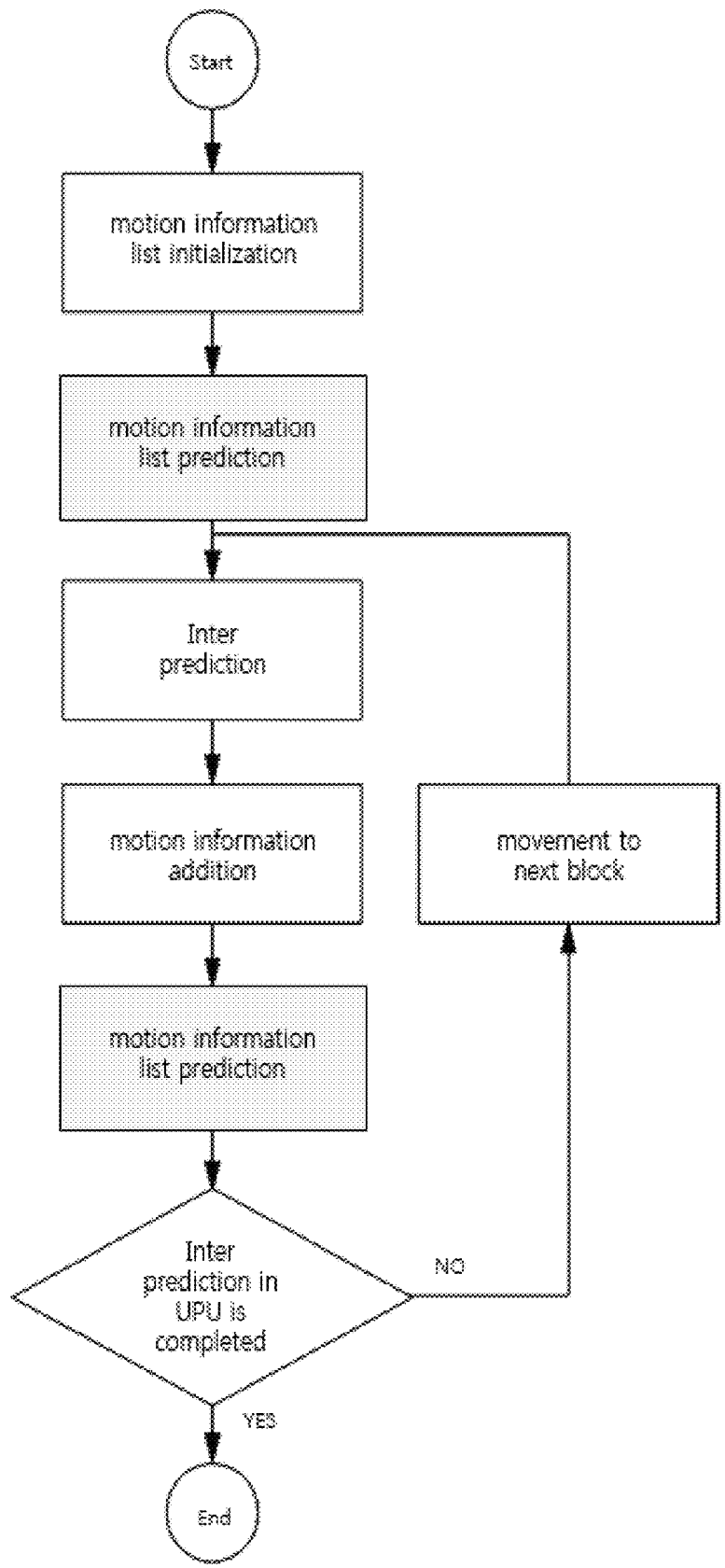
FIG. 12 is a flowchart illustrating an inter prediction method in which motion information list prediction is performed at a motion information list initialization time point and a motion information addition time point.

FIG. 12 is a flowchart illustrating an inter prediction method in which motion information list prediction is performed at a motion information list initialization time point and a motion information addition time point. The description of each step illustrated in the flowchart of FIG. 12 may be the same as that of FIG. 10.

The inter prediction method using the motion information list has been described in FIGS. 10 to 12. The inter prediction step in FIGS. 10 to 12 may be changed to an IBC prediction step, and a block vector generated through the IBC prediction step may be included in a motion information list. The following description means that the inter prediction includes the IBC prediction.

Meanwhile, when using the shared merge list in IBC prediction, the motion information addition step may be omitted.

Figure 13:
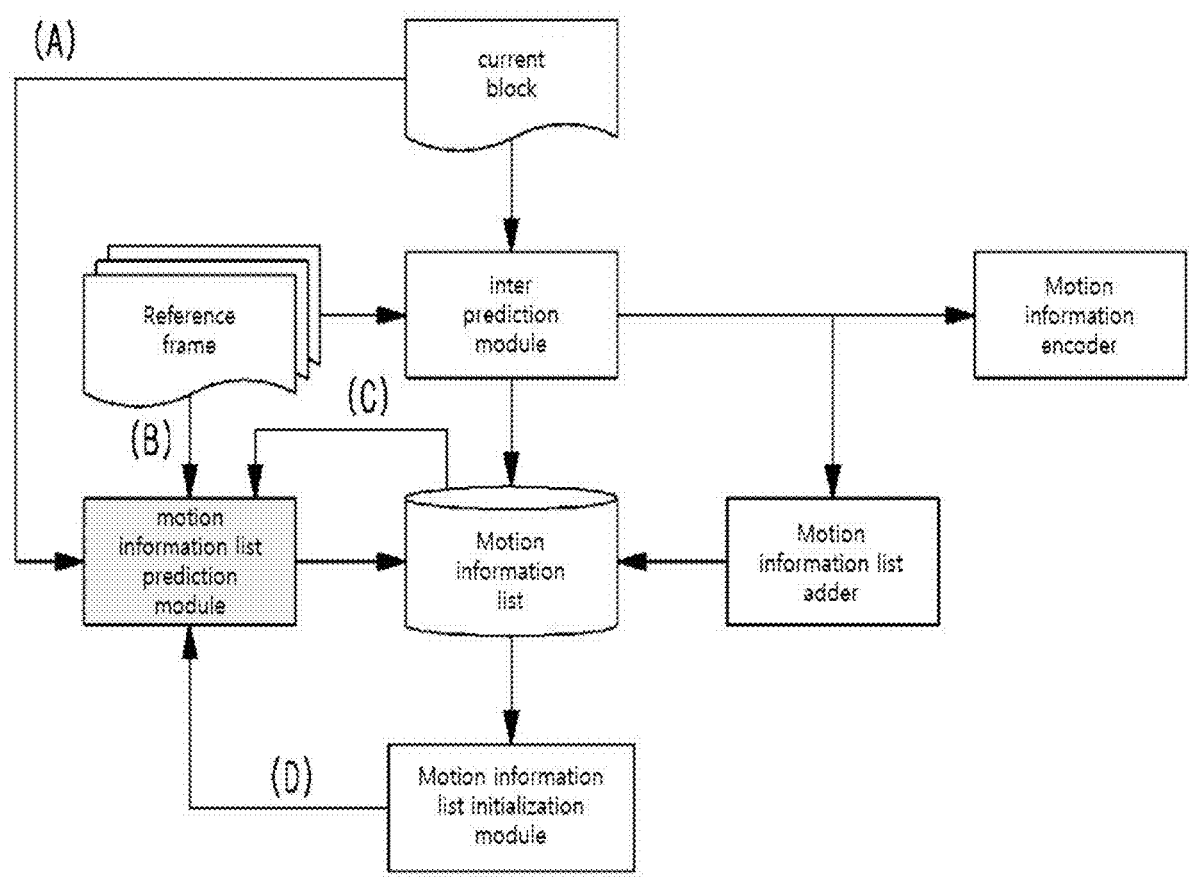
FIGS. 13 and 14 are diagrams illustrating an encoder and a decoder including a motion information list predictor.
Figure 14:
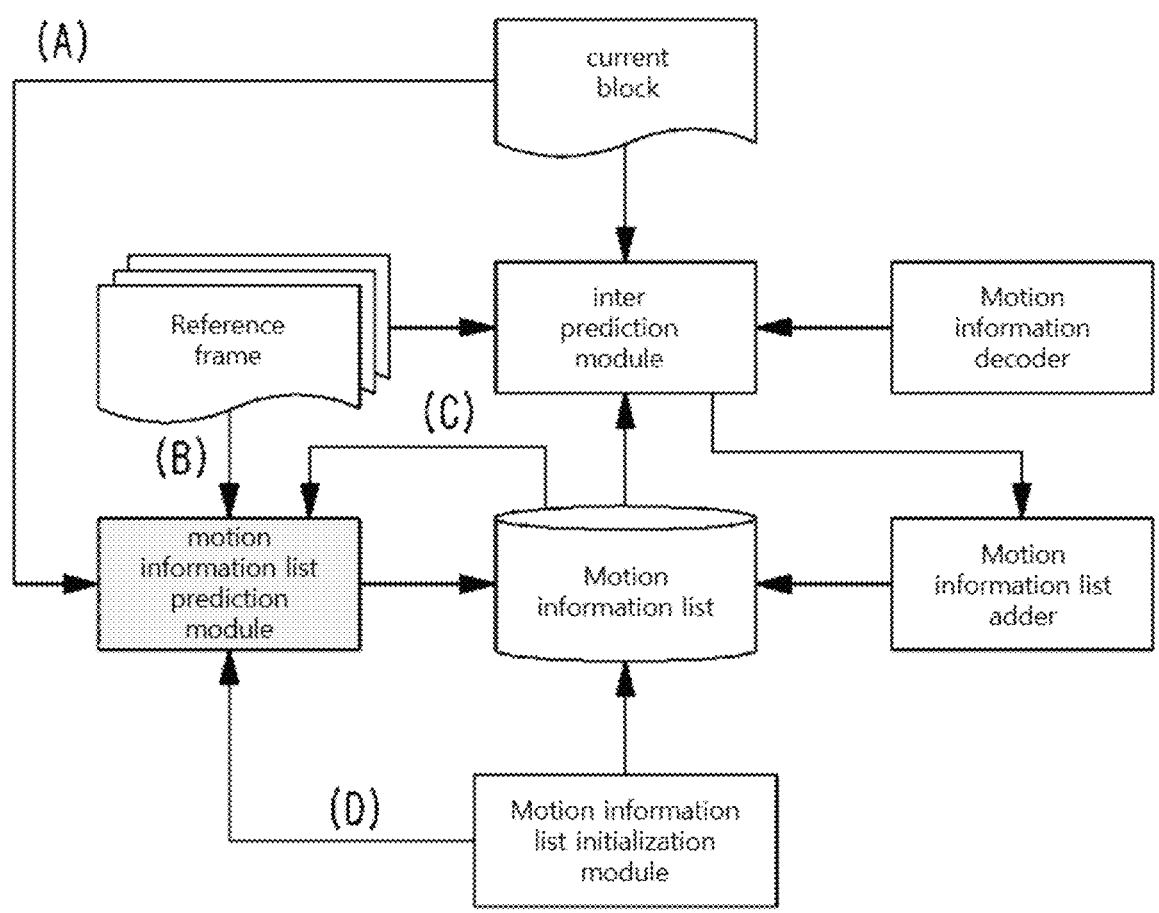

FIGS. 13 and 14 are drawings illustrating an encoder and a decoder including a motion information list predictor.

Referring to FIGS. 13 and 14, an inter prediction module performs inter prediction on a current block through a reference picture. Herein, the inter prediction module may perform inter prediction referring to a motion information list.

The motion information list adding module may add motion information generated as a result of inter prediction to the motion information list.

The motion information list initialization module may initialize information stored in the motion information list according to the change of the UPU or the creation of a new motion information list.

The motion information list prediction module may predict motion information and store the motion information in the motion information list. Herein, various types of information may be referred to according to the motion information list prediction method performed by the motion information list prediction module.

A connection (A) shows a connection between the modules in a case that the motion information list prediction module uses information of the current block, such as a spatial and temporal position of the current block; a connection (B) shows a connection between the modules in a case that the motion information list prediction module uses information of blocks spatially and temporally adjacent to the current block or information of a reference picture with various types of information that can be referenced by the current block; and a connection (C) shows a connection between the modules in a case that the motion information list prediction module uses information stored in the current motion information list. Therefore, the connection of at least one of (A), (B) and (C) may be omitted according to the prediction method performed by the motion information list prediction module.

Also, as shown in FIG. 10, the motion information list prediction module may be performed when the motion information list is initialized. In this case, the motion information list prediction module may operate by receiving a signal from the motion information list initialization module through a connection (D). As shown in FIG. 11, when an operation of the motion information list prediction module operates irrespective of the initialization of the motion information list, the connection (D) may be omitted.

Meanwhile, the motion information encoding module of FIG. 13 may encode motion information generated as a result of inter prediction. The motion information decoding module shown in FIG. 14 decodes a signal encoded by the motion information encoding module of FIG. 13, and allows inter prediction to be performed in the same manner as the encoder through the decoded signal.

An indicator indicating whether to apply a motion information list during inter prediction may be transmitted in a parameter set such as a sequence parameter set or a picture parameter set, a tile header, a slice header, and the like.

FIG. 15 is a diagram illustrating an embodiment that performs signaling, including an indicator indicating whether to apply a motion information list to sequence parameter set (SPS) syntax.

FIG. 16 is a diagram illustrating an embodiment that performs signaling, including an indicator indicating whether to apply a motion information list to a picture parameter set (PPS) syntax.

FIG. 17 is a diagram illustrating an embodiment that performs signaling, including an indicator indicating whether to apply a motion information list to a slice header syntax.

In FIGS. 15 to 17, amvol_enable_flag is information indicating whether inter prediction using a motion information list is allowed. When amvol_enable_flag is true, it indicates that inter prediction using the motion information list is allowed, and when it is false, it indicates that inter prediction using the motion information list is not allowed.

In addition, amvol_prediction_flag is information indicating whether motion information list prediction is performed. That is, amvol_prediction_flag may indicate whether to perform the motion information list prediction step of FIGS. 10 to 12. amvol_prediction_flag may be signaled only when amvol_enable_flag is true.

Meanwhile, when amvol_enable_flag and amvol_prediction_flag are signaled in the slice header as in the example of FIG. 17, the signaling is performed when a type of a slice is not I-slice. This is because an I-slice type slice does not perform inter prediction so that inter prediction using the motion information list is not performed. However, when IBC is performed in the I-slice type slice and the motion information list is available in IBC, amvol_enable_flag may be signaled. In addition, when IBC is performed on the I-slice type slice and motion information list prediction is available, amvol_prediction_flag may be signaled.

Hereinafter, a method of predicting a motion information list according to the present invention will be described.

In the present specification, the current UPU may mean a UPU to which the current block belongs, and the current motion information list may mean a motion information list of the current block.

In addition, motion information list prediction means motion information prediction for the purpose of inclusion in an initialized or newly generated motion information list.

The motion information of the current motion information list may be predicted using a region in which encoding/decoding is completed earlier than the current UPU (that is, a pre-reconstructed region).

Since the motion information of the image has a tendency similar to a spatially and temporally adjacent region, the current UPU may have similar motion information to other spatially and temporally adjacent regions. Therefore, by referring to the motion information in the pre-reconstructed region, it is possible to predict the motion information list motion information of the current UPU.

For example, there may be a method of predicting motion information of a motion information list from a spatially and temporally adjacent region of the current block and a method of predicting motion information of a motion information list of the current UPU from a motion information list of a pre-reconstructed UPU.

1. A Method of Predicting Motion Information of a Motion Information List from a Region Spatially and Temporally Adjacent to a Current Block It is possible to predict motion information of the current motion information list from regions adjacent spatially and temporally and belonging to UPUs different from the current UPU including the current block.

Figure 18:
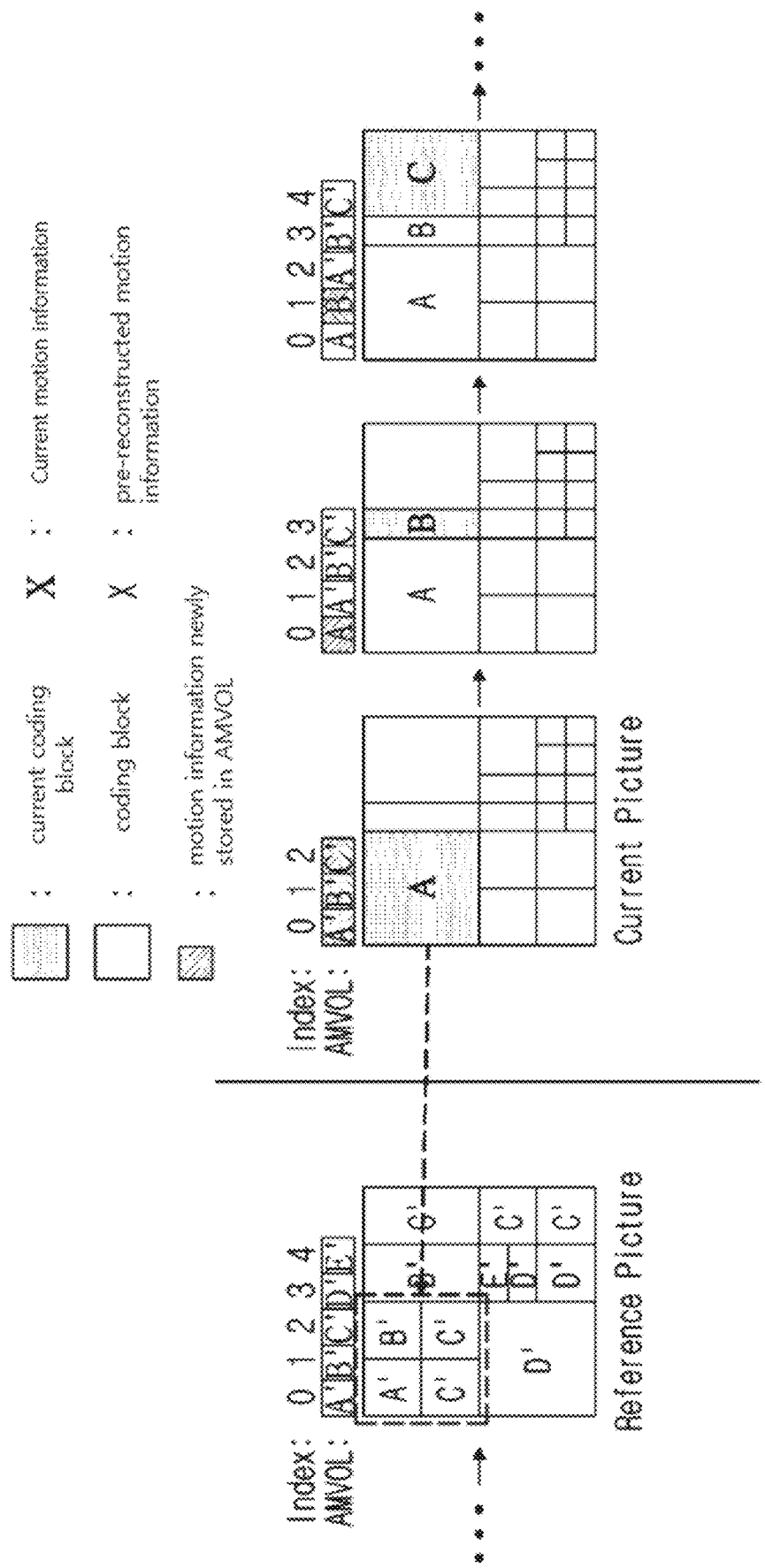
FIG. 18 is a diagram illustrating an example of predicting motion information of a current motion information list from an area temporally adjacent to a current block.

FIG. 18 is an example of predicting motion information of a current motion information list from a region temporally adjacent to a current block.

In FIG. 18, it is assumed that a UPU is a picture unit. Therefore, when a picture is changed, the motion information list may also be initialized.

FIG. 18 illustrates a method of predicting motion information of a motion information list (AMOVL) from a reference picture referenced by a current picture. Here, the reference picture is a pre-reconstructed picture and may hold motion information used to reconstruct the picture.

Referring to FIG. 18, motion information may be predicted from a corresponding block (hereinafter, referred to as "temporal neighboring block") of a reference picture that is spatially identical to but temporally different from the current coding block (e.g., CU, PU, macroblock, CTU, etc.) to be encoded/decoded in the current picture, and may be added to the current motion information list.

Since the motion information list is initialized at a time point when the first coding block of the current picture is reconstructed, there should be no information stored in the motion information list. However, in the example of FIG. 18 to which the present invention is applied, it may be seen that motion information of A', B', and C' derived from temporal neighboring blocks of the reference picture is added to the motion information list.

Figure 19:
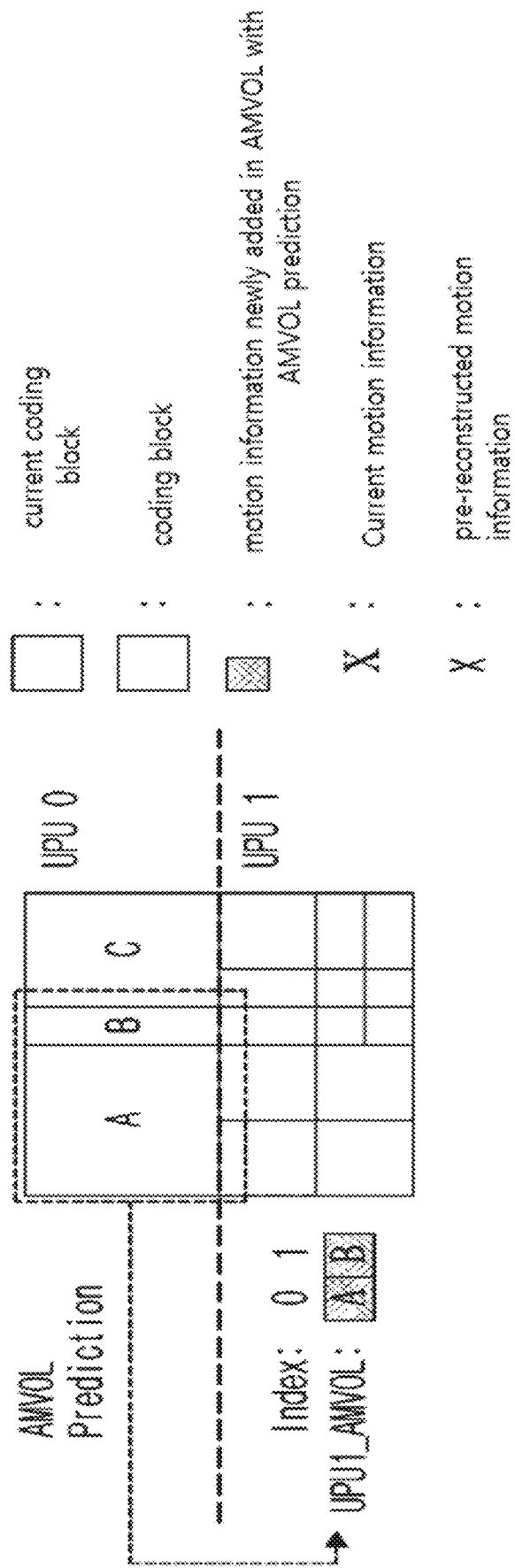
FIG. 19 is a diagram illustrating an example of predicting motion information of a current motion information list from a region spatially adjacent to a current coding block.

FIG. 19 is a diagram illustrating an example of predicting motion information of a current motion information list from a region spatially adjacent to a current coding block.

In FIG. 19, it is assumed that a UPU is a slice unit. Therefore, there may be a plurality of UPUs in one picture.

FIG. 19 shows a method of predicting motion information of motion information list (AMOVL) of a block spatially adjacent to a current coding block (hereinafter, referred to as a "spatial neighboring block").

Referring to FIG. 19, UPU 0 is composed of three blocks and corresponds to a pre-reconstructed region that has already been reconstructed.

Since the motion information list is initialized at a time point when the first coding block of UPU 1 is reconstructed, there should be no information stored in the motion information list. However, in the example of FIG. 18 to which the present invention is applied, motion information of a motion information list may be predicted by referring to motion information of a region spatially adjacent to a current coding block from a pre-reconstructed UPU 0. Therefore, it may be seen that the motion information of A and B is added to the motion information list of UPU 1.

Meanwhile, it was described on the basis of the coding block in FIGS. 18 and 19, it may be described on the basis of a coding tree unit (CTU), coding unit (CU), prediction unit (PU), transform unit (TU), macro block (Macro block), or a block of a predetermined size.

The coding block may store motion information in units of sub blocks. Accordingly, different motion information may be provided in units of sub blocks, and motion information may be referred to regardless of a partitioning type of the coding block.

Even when predicting a motion information list from a spatially and temporally adjacent region, a sub block of a spatially and temporally adjacent coding block may be referred to. Herein, since referring to all sub blocks requires a large amount of calculation, motion information list prediction may be performed by referring to a sub block having a predetermined range or position. A representative value of n sub blocks may be used instead of the minimum unit so that motion information of all sub blocks is not stored.

As an example, when the size of the sub block is 4×4, four sub blocks belong to an 8×8 region. By selecting a representative value from four sub blocks and storing only one motion information in the 8×8 region, it is possible to reduce memory usage for motion information storage of a sub block. Herein, the motion information list prediction may refer to the motion information designated as the representative in the 8×8 region.

The range for selecting the representative value of the sub blocks may be specified in various sizes, such as 4×4, 8×8, 16×16, and the like. The method of selecting the representative value from the sub blocks may include a method of using a fixed position within a range of selecting the representative value, a method of considering a frequency of occurrence, a method of using an average value, and the like. In addition, the representative value may be determined using at least one of a weighted sum, a weighted average value, a median value, a minimum value, and a maximum value, in addition to the average value.

When predicting a motion information list from a temporally adjacent region, since the picture of the temporal neighboring block is different from the current picture, and the reference picture of the temporal neighboring block is different from the reference picture of the current block, the temporal distance indicated by the motion information may be varied.

For example, in the case that the current picture is picture Of counter (POC) 4, the picture of the temporal neighboring block referred to in order to predict the motion information list is POC 8, the reference picture of the current block is POC 8, and the reference picture of the temporal neighboring block is POC 1, the temporal distance between the current picture and the reference picture of the current block have a difference by 4 with respect to the POC, and the temporal distance between the picture of the temporal neighboring block and the reference picture of the temporal neighboring block have a difference by 7 with respect to the POC. In addition, since the current block refers to the future picture, and the temporal neighboring block refers to the past picture, it may be seen that the temporal directions referring to is also opposite to each other.

Therefore, it is necessary to predict and correct the change in motion information over time intervals. This is called motion information scaling.

When motion information list prediction is performed from a temporally adjacent region, the motion information scaling may also be applied to motion information referred to for motion information list prediction.

Even in the case of predicting a motion information list from a temporal neighboring block, it is possible to expect an improvement in coding efficiency through motion information scaling.

However, motion information scaling may require a large amount of computation. Therefore, in performing the motion information list prediction, the motion information scaling may be omitted or motion information requiring the motion information scaling may not be used for the prediction.

When there is little motion of a temporal neighboring block, the motion information scaling may not be required.

Alternatively, the motion information scaling may be omitted when the temporal interval between the current picture and the reference picture of the current block is equal to the temporal interval between the picture of the temporal neighboring block and the reference picture of the temporal neighboring block or a difference between the temporal interval between the current picture and the reference picture of the current block and the temporal interval between the picture of the temporal neighboring block and the reference picture of the temporal neighboring block is less than a predetermined range.

As such, only motion information that does not require the motion information scaling is used for prediction, and accordingly an increase in computation amount due to the motion information scaling may be prevented.

Meanwhile, the motion information requiring the motion information scaling may be given a lower priority than the motion information that does not require the motion information scaling in prediction.

2. Method of Predicting Motion Information of Motion Information List from Motion Information List of Pre-Reconstructed UPU The present method is a method of performing a motion information list prediction of a current UPU using a motion information list of a pre-reconstructed UPU.

UPUs may have motion information lists different from each other, and spatially and temporally adjacent UPUs may have motion information lists similar to each other. Therefore, the current UPU may predict the motion information of the current motion information list by referring to the motion information list of the spatially and temporally adjacent UPU that is pre-reconstructed.

Figure 20:
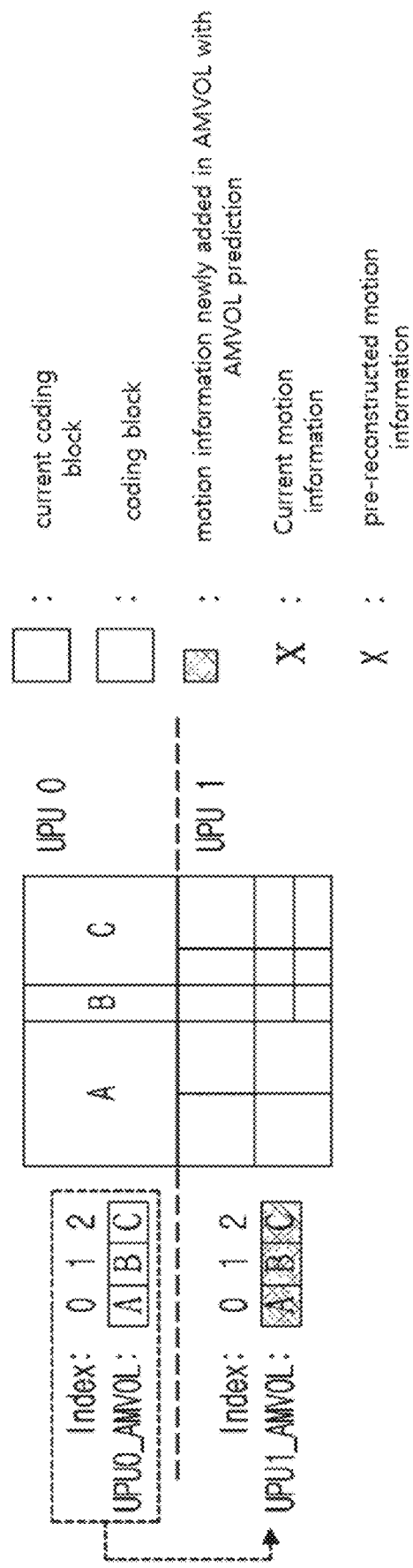
FIG. 20 is a diagram illustrating an example of a method of performing current motion information list prediction with reference to a motion information list of a pre-reconstructed upper prediction unit (UPU).

FIG. 20 is a diagram illustrating an example of a method of performing current motion information list prediction with reference to a motion information list of a pre-reconstructed UPU.

Referring to FIG. 20, it shows a time point when the first coding block of UPU 1 is reconstructed, and the motion information list may be initialized at that time point, so that motion information generated from the current UPU (UPU 1) may not be added.

In an example of FIG. 20 to which the present invention is applied, with reference to a motion information list of a re-constructed UPU 0, the motion information list prediction is performed by adding motion information of the motion information list of the UPU 0 to the motion information list of UPU 1.

After inter prediction of the first block of the current picture is finished, motion information of the first block may be added to the motion information list. Herein, the corresponding motion information may be set to have the lowest index value in the motion information list. The index values of motion information existing in the existing motion information list may be increased one by one and thus stored.

Alternatively, the motion information of the first block may be set to have a predetermined index value in the motion information list. The index value of the motion information existing in the existing motion information list may be stored while being increased one by one.

Meanwhile, when the entire picture is a UPU, the last block of the pre-reconstructed picture is encoded/decoded, and then the final motion information list in which the motion information of the block is stored is used for the motion information list prediction of the first block of the current picture.

That is, all or a part of the motion information stored in the final motion information list of the UPU of the pre-reconstructed picture is used to predict or initialize the motion information list of the current UPU that is the current picture. Here, the UPU of the pre-reconstructed picture may be referred to as a reference UPU.

The motion information list may not store motion information from the current picture before inter prediction of the first block of the current picture is performed. This is because there is no motion information in the current picture. Herein, the motion information list may be predicted or initialized by storing some or all of the motion information stored in the final motion information list of the reference UPU in the current motion information list. The motion information stored in the current motion information list through the motion information list prediction or initialization may be used for inter prediction of the first block of the current picture.

When the current motion information list is predicted from the motion information list of the pre-reconstructed region, the motion information list intermediately configured may be referred to instead of the motion information list finally configured, in the pre-reconstructed region.

The motion information list may accumulate and store motion information generated in the corresponding UPU, and may also delete the stored motion information. Therefore, as encoding/decoding proceeds, the stored information may change. When predicting or initializing the current motion information list, in the case that a location of a coding block to perform prediction through the current motion information list is far from a generation location of the motion information finally stored by the motion information list in the pre-reconstructed region referred to by the current motion information list, the motion information list prediction efficiency may decrease.

For example, when the UPU is a picture unit, the motion information finally stored in the motion information list may be motion information generated from a coding block at the lower right of the picture. Herein, when the number of motion information stored in the motion information list is limited, motion information generated near the upper left end which is a beginning part of the picture from the finally stored motion information is removed from the motion information list, and motion information near the bottom right which is an end part of the picture may be stored in the motion information list. Since the first coding block of the current UPU corresponds to the upper left region of the picture, the motion information generated from the lower right region of the reference picture has low correlation, whereby the prediction efficiency is not high. When predicting or initializing the motion information list, coding efficiency may be higher when referring to the motion information list at the time of storing the information near the upper left region, instead of the pre-reconstructed motion information list that is finally constructed, than when referring to the final motion information list.

However, memory usage is much higher when the motion information list in all steps is stored. Accordingly, after copying and storing a predetermined motion information list at a specific time point so that the memory usage may be reduced, it is possible to separately use a reference motion information list buffer that may be used to predict or initialize the motion information list.

For example, the motion information lists of the upper left and lower right regions of the UPU unit may be stored in the reference motion information list buffer.

In addition, when the motion information list of the pre-reconstructed picture is used for the prediction of the motion information list, the current picture is different from the pre-reconstructed picture, and the reference picture of the current block is different from reference picture referred to by motion information in motion information list of pre-reconstructed picture. Herein, since the prediction efficiency may decrease due to the temporal distance difference between the pre-reconstructed picture and the reference picture referred to by the motion information, correction such as motion information scaling and the like may be used.

In addition, the above-described method may designate a UPU to be referred to. As a method of designating a UPU to be referred to, there are a method of allowing an encoder and a decoder to refer to the same UPU by transmitting and receiving an encoded signal and a method of omitting additional signal transmission and reception by selecting a UPU by a predetermined method.

Although, in FIG. 20, a method of copying all the motion information list of the reference UPU as a method of predicting the current motion information list is described, a method of copying only part of the motion information of the motion information list to the current motion information list may be applied.

As an example, only motion information below a pre-defined index from the motion information list of the reference UPU may be added to the current motion information list.

3. Method of Predicting Motion Information of Current Motion Information List from Motion Information Previously Included in Current Motion Information List When the number of motion information stored in the motion information list is insufficient, the insufficient number of motion information in motion information list may be predicted and added from the current motion information list.

Additionally predicting the motion information of the current motion information list from the motion information previously included in the current motion information list may be performed at at least one of a time point after the motion information is added to the motion information list, a time point that is added, and a time point at which motion information is generated in the coding block before the motion information is added to the motion information list.

Figure 21:
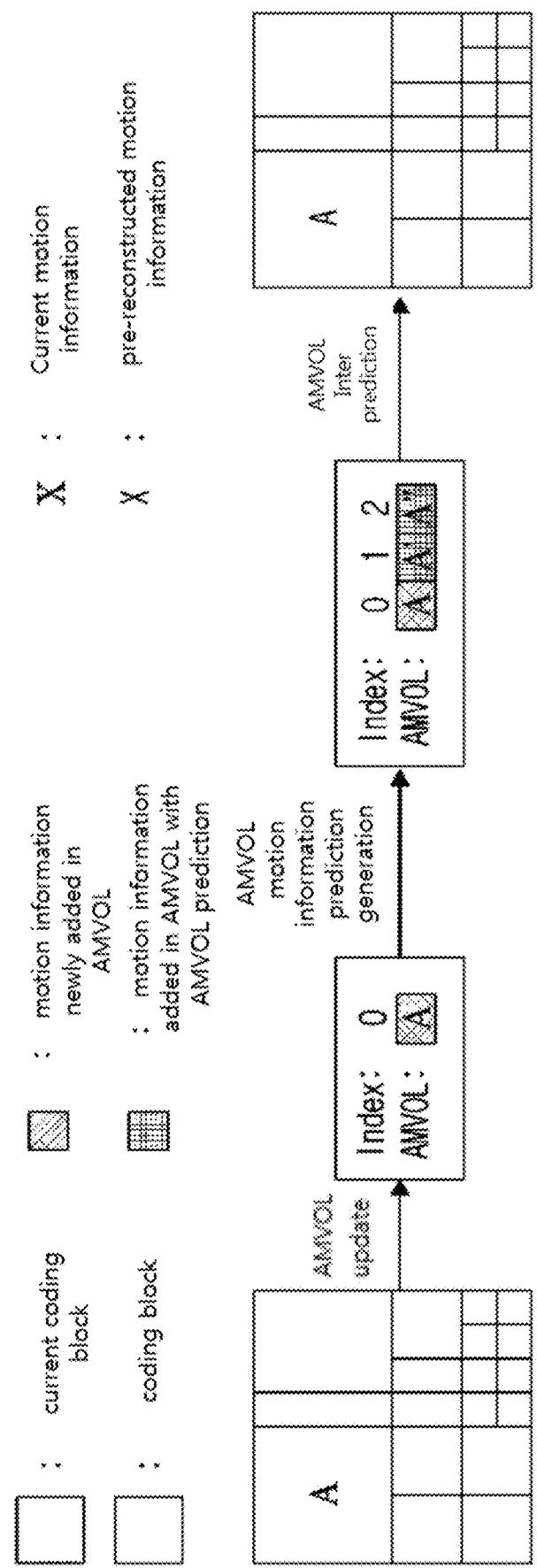
FIG. 21 is a diagram illustrating a method of performing motion information list prediction from motion information stored in a current motion information list.

FIG. 21 is a diagram illustrating a method of performing a motion information list prediction from motion information stored in a current motion information list.

Referring to FIG. 21, it may be seen that motion information A generated by inter prediction of the first coding block is added to the motion information list (AMVOL update). This means a state that only one motion information is stored in the motion information list. Therefore, when inter prediction is performed through the motion information list, encoding efficiency may be deteriorated.

In FIG. 21, it may be seen that motion information list prediction is performed before performing inter prediction of the next coding block (or after updating the motion information list). The number of motion information stored in the motion information list may be increased by predicting motion information A' and A" from the motion information A stored in the current motion information list and storing the same in the motion information list. By increasing the number of motion information in the current motion information list, the efficiency of inter prediction using the motion information list can be improved.

Hereinafter, motion information existing in the current motion information list is referred to as existing motion information, and newly predicted motion information is referred to as predicted motion information.

The following methods 1) to 3) are examples of a method of deriving predicted motion information using existing motion information.

1) A Method of Converting Motion Vector of Existing Motion Information and Deriving Predicted Motion Information The motion vector represents, as motion, the spatial distance between the block using the corresponding motion information and the region to be referred to. Therefore, when the motion vector is converted, the region to be referred to is changed.

For example, there is a method of modifying the motion vector of the existing motion information using a predetermined method.

The method of modifying the motion vector may be at least one of adding of the displacement, scaling, and mirroring.

The addition of the displacement is a method of modifying the motion vector by adding a predetermined displacement to the motion vector.

As an example, the motion vector may be expressed as MV (x, y) having x-axis displacement and y-axis displacement, and by adding a predetermined displacement dx, dy to MV(x, y), it is possible to generate a modified motion vector MV'(x+dx, y+dy). Here, dx and dy may be integers, and dx and dy may be values different from each other.

The scaling is a method of modifying a motion vector by multiplying a predetermined magnification sx and sy by a motion vector MV(x, y). MV'(sx*x, sy*y), which is a motion vector modified via scaling, may be generated. By using different magnifications, various modified motion vectors may be generated. Here, sx and sy may be integers, and sx and sy may be values different from each other.

The mirroring is a method of modifying the motion vector by reversing the direction while maintaining the size of the motion vector. For example, when x-axis and y-axis mirroring are applied to the motion vector MV(x, y), it is possible to generate MV'(-x, -y), which is a modified motion vector. By defining the axis to be applied, it is possible to generate various modified motion vectors.

2) Method of Converting Reference Information of the Existing Motion Information and Deriving the Predicted Motion Information The reference information is information about a reference picture including a region referred to in inter prediction. By changing the reference information included in the motion information, the reference picture is changed so that the region referred to may be changed. Even in the case of the same motion vector, when a reference picture is changed, information of a pixel referred to may be changed, and thus a result of inter prediction may be changed. Herein, the motion vector is corrected by using the distance on the time axis between the current picture and the reference picture of the existing motion information and the distance on the time axis between the current picture and the changed reference picture, thereby improving precision of motion information prediction FIG. 22 is an example illustrating a process of deriving predicted motion information by changing a reference picture of existing motion information and correcting a motion vector accordingly.

Figure 22:
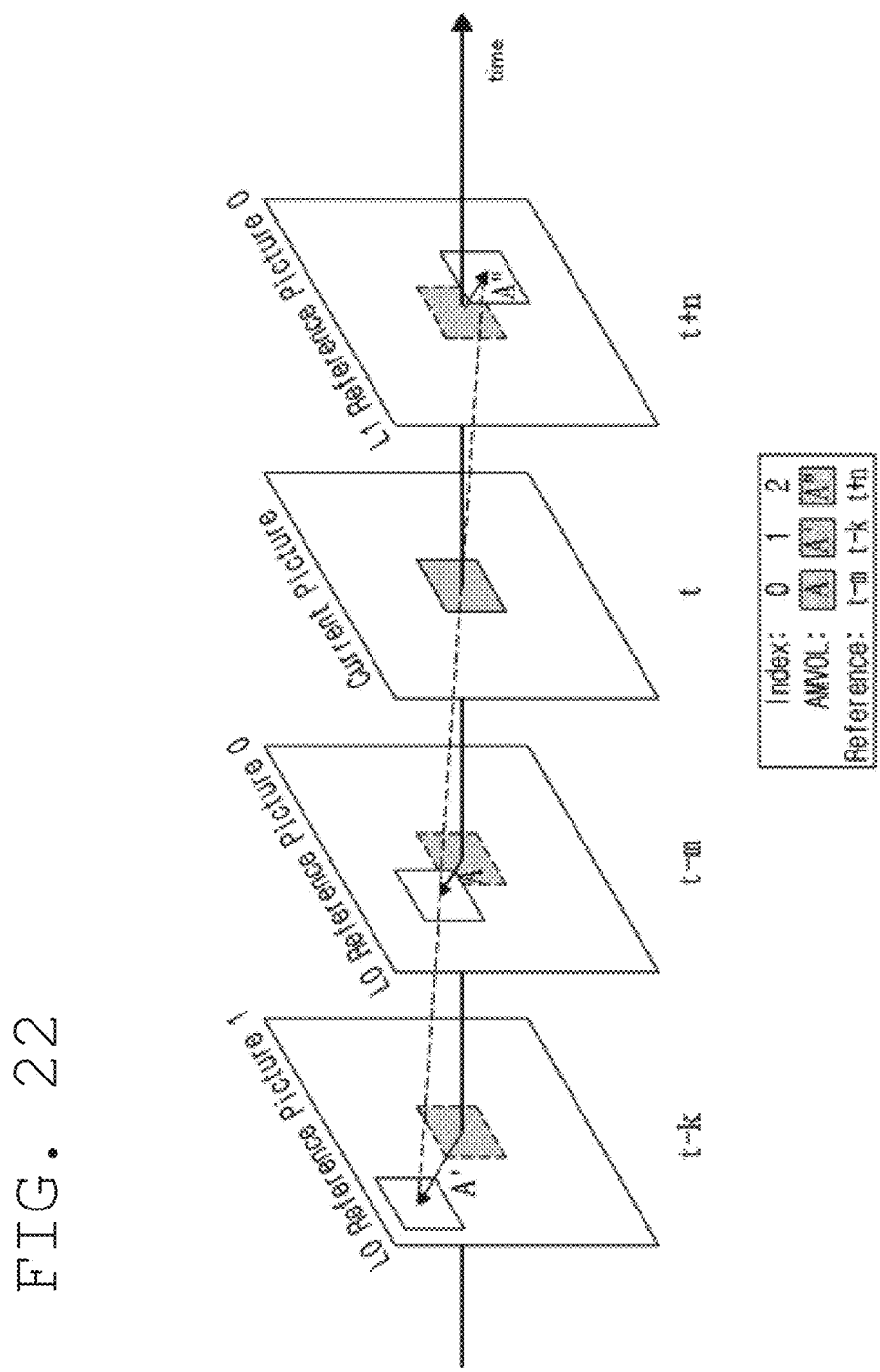
FIG. 22 is a diagram illustrating an example of a process of deriving prediction motion information by changing a reference picture of existing motion information and correcting a motion vector accordingly.

Referring to FIG. 22, the current picture is located at a point t on a time axis, and a reference picture to which the current picture may refer is located at points t−k, t−m, and t+n on a time axis. The current motion information list has a motion vector A referring to L0 reference picture 0 which is a reference picture at a time point t−m at index 0.

The motion information A may be corrected in consideration of a distance (picture Of counter, POC) on a time axis between the current picture and each reference picture, predicting that the movement of the object is close to linear within a short time change.

When reference information is changed to L0 reference picture 1 which is a reference picture at the time point t−k, and L1 reference picture 0 which is a reference picture at the time point t+n, the motion information A may be corrected to A' and A'', respectively, in consideration of the distance on the time-axis between the current picture and the reference picture. The predicted motion information derived in the above manner may be added to the motion information list.

3) Method of Deriving Predicted Motion Information Using a Plurality of Existing Motion Information When two or more motion information are present in the motion information list, predicted motion information may be derived by partially using each one of existing motion information or using an average of two or more motion information.

In addition, at least one of statistical values such as weighted sum, weighted average value, median value, minimum value, maximum value, and the like may be used, in addition to the average.

Meanwhile, reference information of any one of existing motion information may be used as reference information of predicted motion information.

Alternatively, predicted motion information having reference information different from the reference information of the existing motion information may be derived.

As an example, the reference information may be signaled in an upper parameter set, a slice header, or the like, and a picture indicated by the first index of the reference picture list may be used as reference information of predicted motion information.

4. Method of Predicting Predefined Motion Information as Motion Information of Current Motion Information List The method is a method of predicting predefined motion information as motion information of the current motion information list. Specifically, motion information defined similarly in the encoder and the decoder may be added to the current motion information list.

The predefined motion information may include motion vector information having a specific motion value in x and y directions, such as (0, 0), (0, 1), (0, −1), (1, 0), (−1, 0), and the like.

In addition, the reference information of the predefined motion information may be defined in advance, such as the "0"th picture of the reference picture list L0 or the "0"th picture of the reference picture list L1.

On the other hand, the encoder may generate a flag indicating whether or not to use the predefined motion information and deliver the same to the decoder.

When there is a plurality of predefined motion information, the encoder may generate an identifier (or index, etc.) indicating which motion information to apply and transmit the same to the decoder.

The decoder may determine whether to apply predefined motion information and which motion information to apply on the basis of the transmitted information.

There may be a case where there is no pre-reconstructed region to which the current UPU may refer, or a case where the number of motion information that may be predicted from the pre-reconstructed region referred to is insufficient. In such cases, the methods 3 and 4 described above may be used for motion information list prediction.

5. Method of Excluding Candidates Overlapped with Other Motion Prediction Methods A plurality of inter prediction methods may be used in encoding and decoding, and motion information included in a motion information list may be used for motion information prediction in various inter prediction methods. Herein, the motion prediction candidate used by the inter prediction method may overlap with the predicted motion information of the motion information list.

As an example, motion information of a temporal merge candidate in a merge mode and the motion information predicted for the motion information list are identical and thus overlapped with each other.

In the above case, when using the same motion information for inter prediction, prediction efficiency may be deteriorated. Therefore, in consideration of a motion prediction method (e.g., a merge candidate in merge mode, a motion vector candidate in AMVP mode, etc.) used for inter prediction, the motion information may be set to have more various predicted information without overlapping.

When candidates of the motion prediction method and predicted motion information of the motion information list overlap with each other, it is possible to determine whether to use the predicted motion information of the motion information list according to a priority.

When the priority of the candidates of the motion prediction method is high, predicted motion information of the motion information list may not be used. That is, the predicted motion information may not be included in the motion information list.

Conversely, when the priority of candidates of the motion prediction method is low, predicted motion information of the motion information list may be used. That is, the predicted motion information may be included in the motion information list. The candidate of the motion prediction method may not be included in the motion information list.

In addition, when the priority of the candidates of the motion prediction method and the priority of the predicted motion information of the motion information list are the same, the predicted motion information of the motion information list may be used or may be changed to predetermined motion information.

In order to prevent overlapping of the predicted motion information of the motion prediction list and the candidate of the motion prediction method, the predicted motion information list of the motion information list may be set to be derived at a predefined position that is not overlapped with the block position of the candidate of the motion prediction method at a time point when encoding/decoding starts.

For example, a collocated CTU unit may be designated, and motion information may be derived from a predefined position in the CTU.

Figure 23:
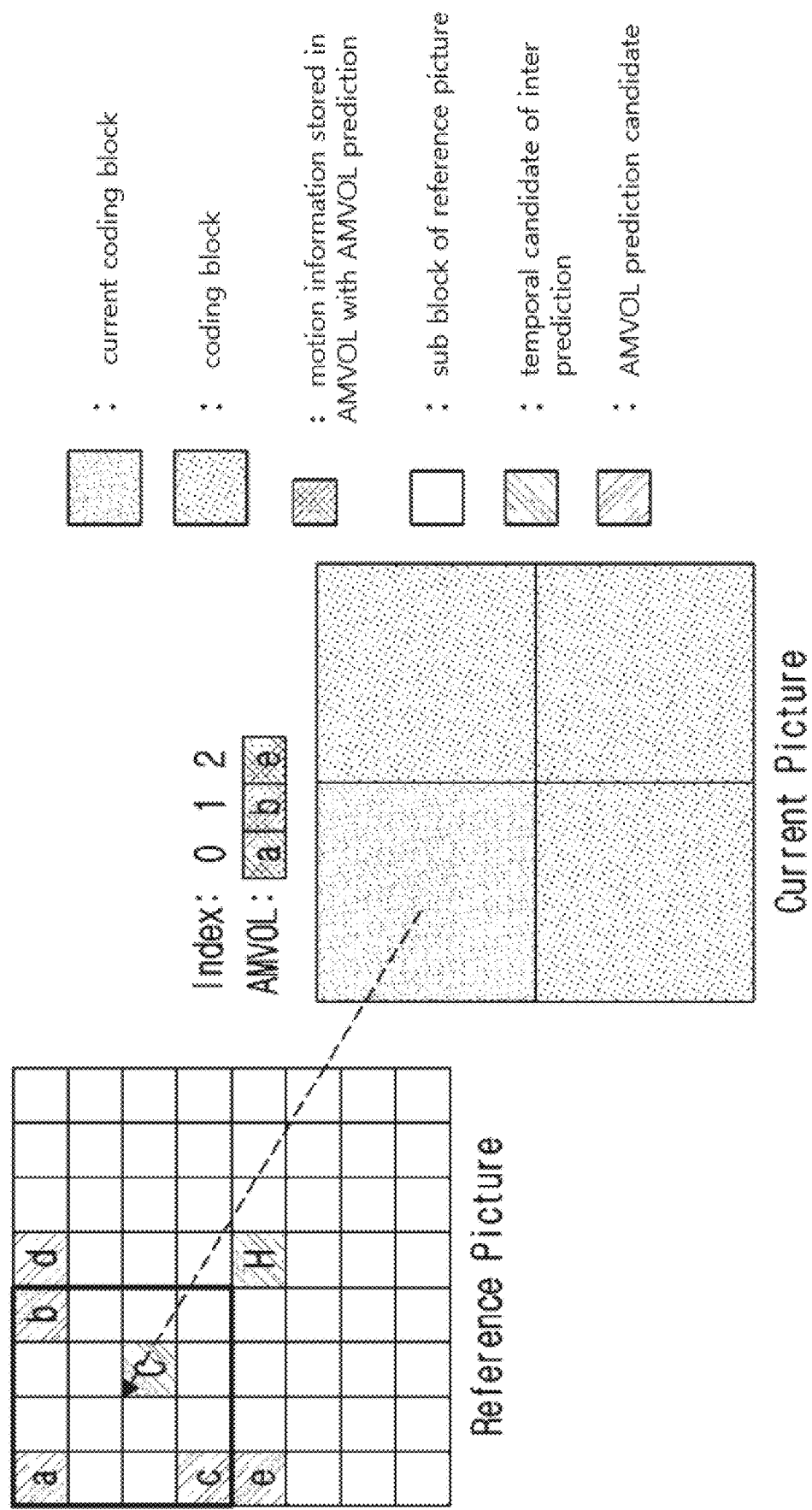
FIG. 23 is a diagram illustrating a method of predicting a motion information list that does not overlap with a candidate of the motion prediction method.

FIG. 23 is a diagram illustrating a method of predicting a motion information list that does not overlap with a candidate of the motion prediction method. In FIG. 23, positions C and H indicated by a diagonal pattern (a diagonal pattern from an upper right end to a lower left end) may refer to positions of temporal candidates that may be used in inter prediction of a current coding block.

Referring to FIG. 23, a pre-reconstructed region used for motion information list prediction may be set to a region at a position different from the positions C and H.

As shown in FIG. 23, the motion information of the motion information list may be set to be derived at positions a, b, c, d, and e except for the positions C and H.

In addition, when adding the motion information to the motion information list, the same motion information as the motion information of the positions C or H may not be added to the motion information list.

Figure 24:
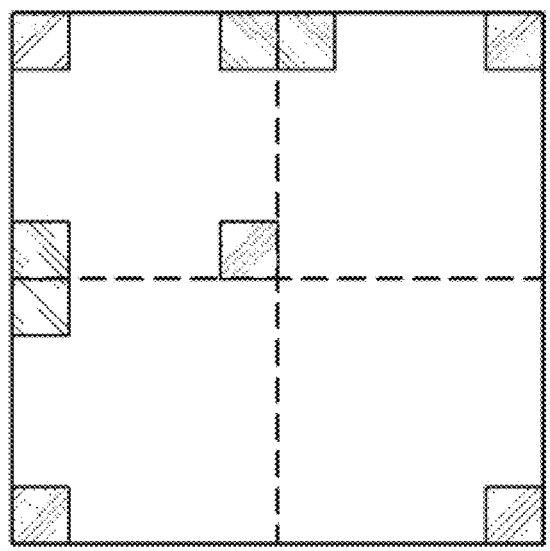
FIG. 24 is a diagram illustrating an embodiment of setting a position referenced for motion information list prediction in a CTU unit when the position of a temporal candidate of the motion prediction method is the same as the positions C and H of FIG. 23.

FIG. 24 is a diagram illustrating an embodiment of setting a position referenced for motion information list prediction in units of CTU when the positions of temporal candidates of the motion prediction method are the same as the positions C and H of FIG. 23.

When configuring the reference position in units of CTU in the same manner as in FIG. 24, it is possible to simplify the motion information list prediction structure by using a fixed position while increasing the coding efficiency by referring to a region not predicted by the existing motion prediction method.

In FIG. 24, a diagonal pattern block (a diagonal pattern block from the top right to a bottom left) and an inverse diagonal pattern block (a diagonal pattern block from the top left to the bottom right) may mean the positions of motion information referenced for prediction of a current motion information list in a collocated CTU. The diagonal pattern block means a reference region having a higher priority than the reverse diagonal pattern block.

Meanwhile, when the motion prediction candidate used by the inter prediction method is overlapped with the predicted motion information of the motion information list, the overlapped predicted motion information may not be used for inter prediction.

6. Method of Using Predicted Motion Information Separately from General Motion Information In the present specification, the general motion information may mean motion information added to the motion information list as motion information generated by inter prediction, and motion information added to the motion information list in the motion information addition step of FIGS. 10 and 11. The predicted motion information may mean motion information generated through the motion information list prediction as described above, and may be motion information added to the motion information list in the motion information list prediction steps of FIGS. 10 and 11.

The predicted motion information may have lower motion information prediction efficiency than general motion information. Therefore, when the predicted motion information has a higher priority than the general motion information, the coding efficiency may be reduced. Therefore, the predicted motion information may be made separately from the general motion information so that the priority of the predicted motion information may be lowered or corrected.

In addition, in the case that general motion information is added, when the motion information list has already had a limited maximum number of motion information, predicted motion information may be removed first.

Figure 25:
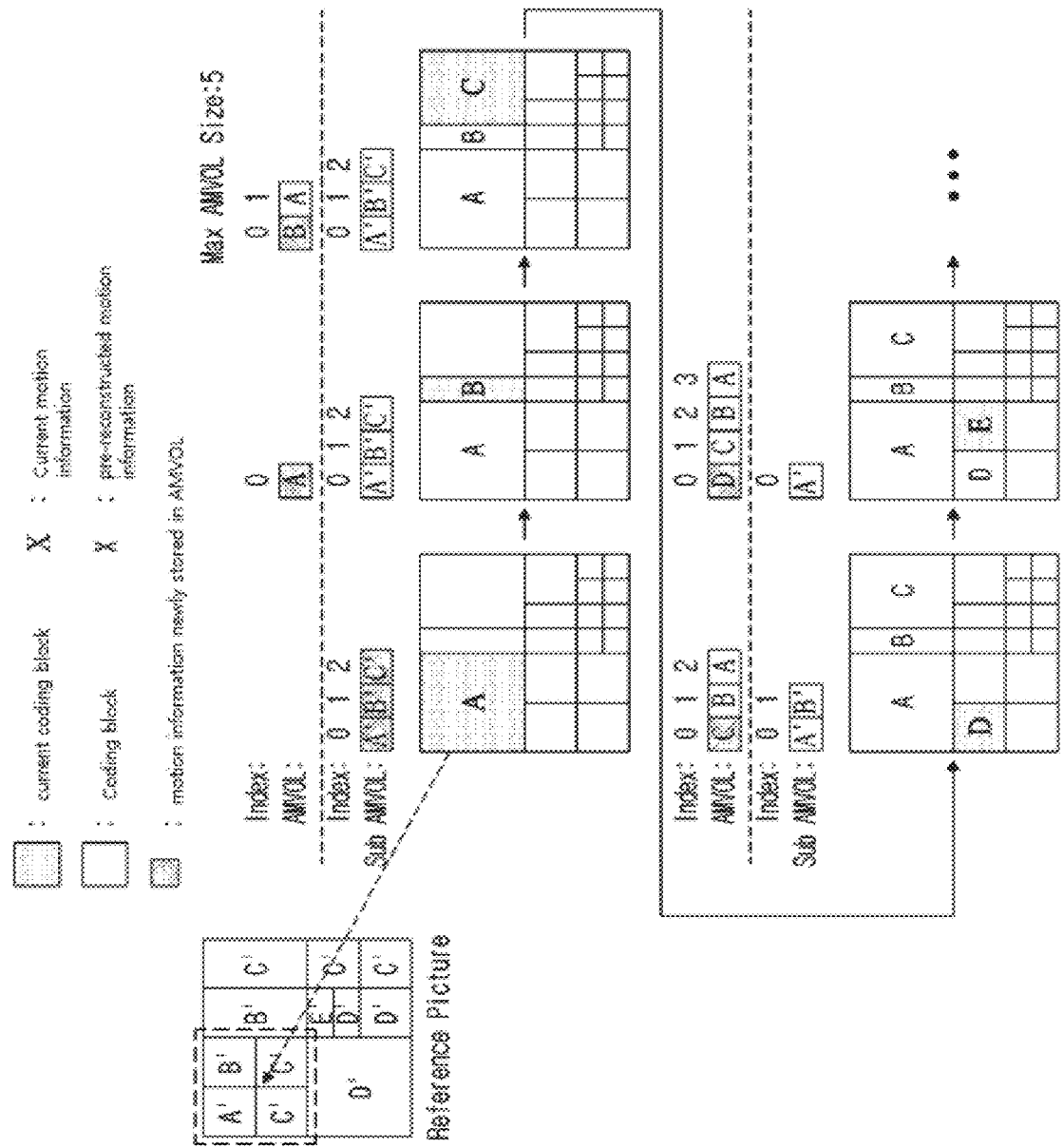
FIGS. 25 and 26 are diagrams illustrating an embodiment of a method of using predicted motion information and general motion information separately.
Figure 26:
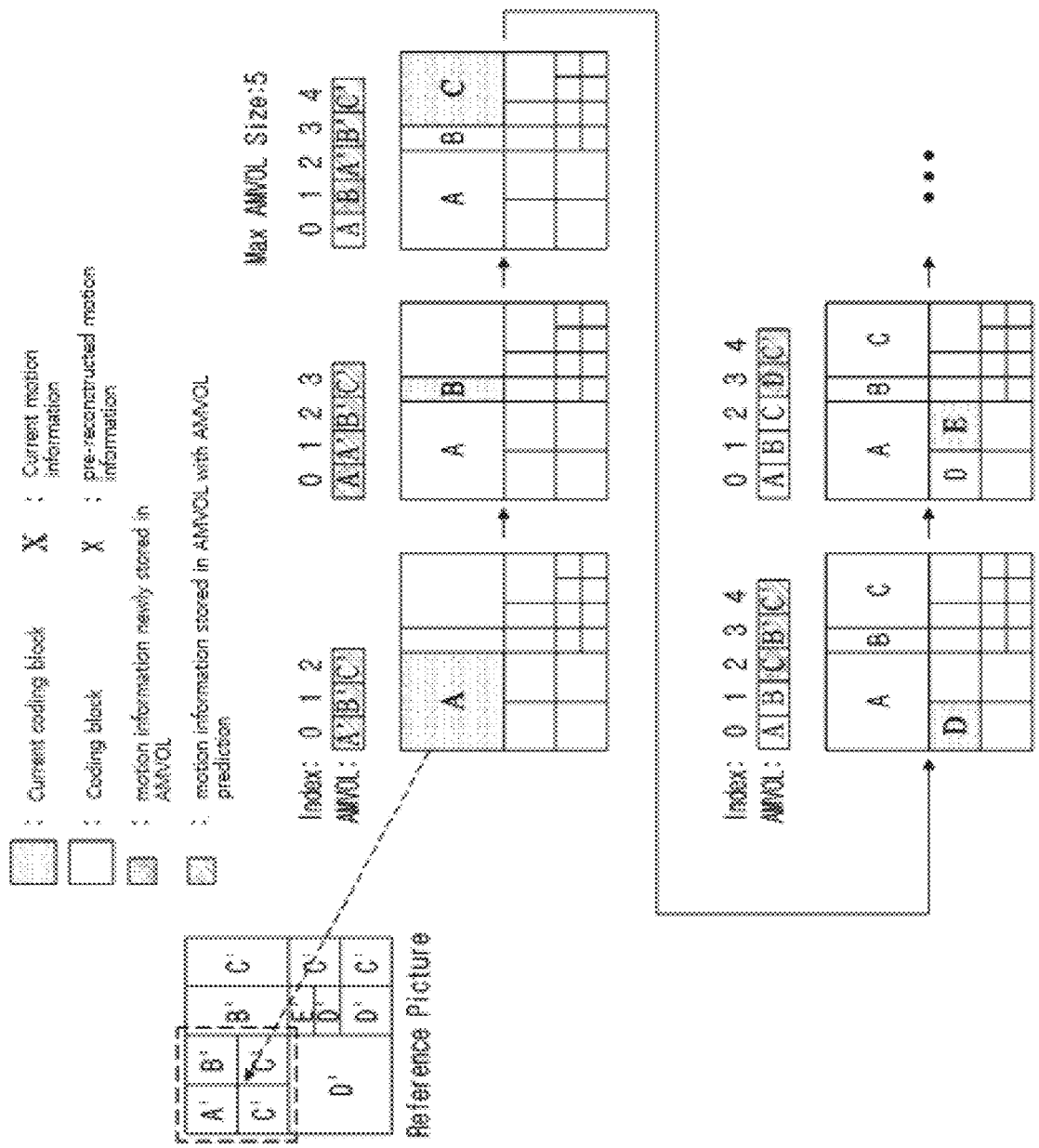

FIGS. 25 and 26 are diagrams illustrating an embodiment of a method of separately using predicted motion information and general motion information. The motion information may be added to the motion information list in FIGS. 25 and 26 in a first in, first out (FIFO) manner, and the size of the motion information list is limited to 5. Here, the size of the motion information list also includes the size of the sub motion list.

Referring to FIG. 25, there may be a motion information list (AMVOL) storing general motion information and a sub-motion information list (Sub-AMVOL) storing a predicted motion information list.

Before performing inter prediction of the first coding block, no information is stored in the motion information list, and the motion information A', B', and C' predicted from the reference picture may be stored in the sub motion information list.

Then, the motion information may be added to the motion information list as inter prediction of each coding block is performed.

Here, when reaching the maximum size of the motion information list, the motion information is first deleted from the sub motion information list in which the predicted motion information is stored, and new motion information may be added to the motion information list.

Meanwhile, the information indicating whether the sub motion information list is used, the size information of the motion information list, or the size information of the sub motion information list may be information preset in the encoder/decoder.

Alternatively, the information indicating whether the sub motion information list is used, the size information of the motion information list, or the size information of the sub motion information list may be information signaled from the encoder to the decoder.

Here, the size of the motion information list may be limited by a preset range. For example, the preset range may be from 0 to 5.

In addition, the size of the motion information list may be limited by the information signaled from the encoder to the decoder. The information indicating the size of the motion information list may be signaled at a higher level of a bitstream, such as a sequence parameter set, a picture parameter set, a slice header, a tile header, a tile group header, and the like.

FIG. 26 is a diagram illustrating an embodiment in which a single motion information list is used without using a sub motion information list unlike FIG. 25.

In the example of FIG. 26, the motion information list may be managed in a FIFO manner. That is, the motion information list has a method of adding the generated motion information to the last part of the motion information list, and first removing the preceding motion information that is input first when exceeding the maximum size of the motion information list.

In other words, when the number of motion information stored in the motion information list reaches the maximum value, the motion information indicated in the last index of the motion information list is removed, and newly derived motion information is added to the motion information list. Herein, the index of the motion information included in the motion information list may be increased by 1. The newly added motion information may be added to the motion information list in such a manner as to be indicated by index 0.

In addition, the motion information stored in the motion information list may have a higher priority as the index is lower.

Herein, the motion information stored by the motion information list prediction may be processed separately from the general motion information list motion information generated and stored in the current UPU.

Since predicted motion information has low priority, when general motion information is newly added, an index lower than motion information in the predicted motion information list may be allocated.

In addition, when reaching the maximum size of the motion information list, predicted motion information may be preferentially deleted and new motion information may be added to the motion information list.

Meanwhile, the lower the index, the higher the priority, as described in the foregoing. On the contrary, the higher the index, the higher the priority.

Therefore, the FIFO manner of the motion information list may also be performed as follows. That is, when the number of motion information stored in the motion information list reaches the maximum value, the motion information indicated by index 0 of the motion information list may be removed, and newly derived motion information may be added to the motion information list. Herein, the index of the motion information included in the motion information list may be decreased by 1. The newly added motion information may be added to the motion information list in such a manner as to be indicated by the largest index among the motion information included in the motion information list.

Meanwhile, when the newly added motion information is stored in the motion information list, previously stored motion information which is overlapped is removed from the motion information list, and the newly derived motion information may be included in the motion information list. Herein, the indexes of the motion information of the motion information list having an index value larger than the removed motion information may be decreased by 1. The newly added motion information may be added to the motion list in such a manner as to be indicated by the largest index among the motion information included in the motion information list.

The motion information included in the motion information list may have a priority when used for motion information prediction. The motion information may be implicitly expressed according to the order in which the motion information is stored in the motion information list, the priority is explicitly set as candidates when performing inter prediction using the motion information list, or selective use by the priority is possible.

In addition, since the motion information list may have a limited size, when reaching the limited size, motion information stored in the motion information list may be removed and new motion information may be added according to the priority.

Meanwhile, the predicted motion information may have prediction efficiency lower than that of the normal motion information. However, since it is not in all cases, the priority of the predicted motion information may be recalibrated.

Additional information may be used to recalibrate the priority of predicted motion information.

The motion information list may include additional information in addition to motion information. Here, the additional information may mean information indicating inter prediction efficiency of motion information included in the motion information list, and may also be referred to as prediction potential information. For example, the additional information may be information derived on the basis of the number of occurrences of the same motion information in the UPU.

The additional information may represent a relative up and down of coding efficiency when using the motion information list for inter prediction.

As a method for determining the additional information, there may be a determination method based on the frequency of occurrence of the motion information, a determination method based on the prediction efficiency using the motion information, a determination method based on the location where the motion information is derived, and a determination method based on whether to use the motion information.

The determination method based on the frequency of occurrence of motion information is a method of determining the additional information on the basis of the number of times that the same motion information as the motion information stored in the motion information list is generated in the UPU.

The determination method based on the prediction efficiency using motion information is a method of determining the additional information on the basis of an energy distribution of a residual signal or energy average value of a residual signal in a coding block in which motion information stored in the motion information list is used.

The determination method based on the location from which the motion information is derived is a method of determining the additional information on the basis of the spatial and temporal distance between the current coding block and the coding block in which the motion information stored in the motion information list is derived.

Meanwhile, the priority of predicted motion information may be recalibrated on the basis of whether the predicted motion information is used for inter prediction. This is because the corresponding predicted motion information is likely to be used in the future when it is used for inter prediction.

The information necessary to recalibrate the priority of predicted motion information may be information that is preset in the encoder/decoder or signaled from the encoder to the decoder.

Figure 27:
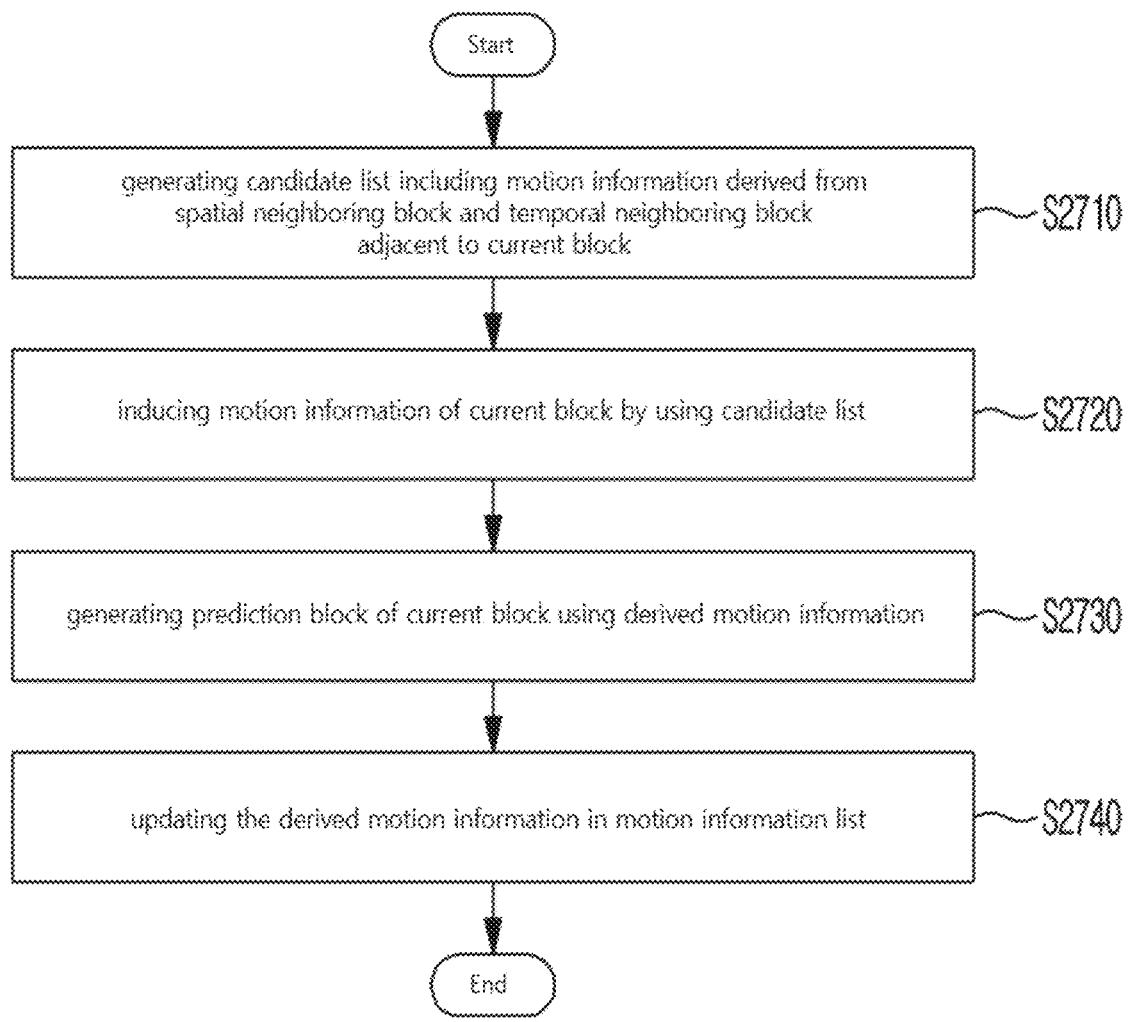
FIG. 27 is a flowchart illustrating an image decoding method according to an embodiment of the present invention.

FIG. 27 is a flowchart illustrating an image decoding method according to an embodiment of the present invention.

Referring to FIG. 27, the image decoding apparatus may generate a candidate list including motion information derived from a spatial neighboring block and a temporal neighboring block adjacent to a current block (S2710).

Here, the candidate list may be any one of a merge candidate list in merge mode, a motion vector candidate list in AMVP mode, a merge candidate list in IBC mode, a block vector candidate list in IBC mode, and a shared merge list in IBC mode.

In addition, the image decoding apparatus may induce motion information of the current block by using the candidate list (S2720).

The image decoding apparatus may generate a prediction block of the current block using the derived motion information (S2730). In detail, the image decoding apparatus may generate a prediction block of the current block by performing inter prediction or IBC prediction.

In addition, the image decoding apparatus may update the derived motion information in the motion information list (S2740). Step S2740 may be the same as the motion information addition step of FIGS. 10 and 11 described above.

Meanwhile, the candidate list may be generated including at least one of motion information included in the motion information list updated in the block decoded before the current block. Here, the motion information list may be the above-described AMVOL or HMVP list.

Meanwhile, when the decoding of a predetermined region is completed so that the region is changed in the motion information list, the image decoding apparatus may initialize the motion information list. Here, the predetermined region may be any one of a block composed of one or more CUs or a block composed of one or more CTUs. The above-described initialization may be the same as the motion information initialization step of FIGS. 10 and 11.

Meanwhile, the motion information list may have a limit of a predetermined size. Here, the predetermined size may be 6.

Meanwhile, when there is a plurality of motion information in the motion information list updated in the block decoded before the current block, the image decoding apparatus may include the average of at least two or more motion information of the plurality of motion information in the candidate list.

Meanwhile, when the motion information of the motion information list updated in the block decoded before the current block is the same as the motion information previously included in the candidate list, the image decoding apparatus may allow the motion information of the motion information list not to be included in the candidate list.

In addition, when the current block is the IBC prediction mode and the candidate list is a shared merge list, the method of updating the derived motion information in the motion information list may be omitted.

Meanwhile, when the number of motion information stored in the motion information list is a preset value, the image decoding apparatus may delete the motion information stored first in the motion information list and store the motion information derived in step S2720.

The image decoding method has been described above with reference to FIG. 27. Since the image encoding method of the present invention may be described similarly to the image decoding method described with reference to FIG. 27, redundant description is omitted.

The bitstream generated by the image encoding method of the present invention may be temporarily stored in a computer-readable non-transitory recording medium, and may be decoded by the above-described image decoding method.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is equal to or greater than 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in an apparatus for encoding/decoding an image.

The invention claimed is:

1. A method of generating a candidate list of candidates for motion information generated in image decoding, comprising:
    generating the candidate list including motion information generated using information of a neighboring block adjacent to a current block;
    deriving motion information of the current block using the candidate list;
    generating a prediction block of the current block using the derived motion information of the current block; and
    updating a motion information list to store the derived motion information of the current block,
    wherein the candidate list includes at least one of motion information included in the motion information list used for a block decoded before decoding for the current block, and
    wherein the derived motion information for the current block is stored in the motion information list to be used for Intra Block Copy (IBC) mode when a size of the current block is greater than or equal to a first predetermined size and the size is less than or equal to a second predetermined size.

2. The method of claim 1, wherein the motion information list is initialized when decoding of a predetermined region is completed so that the region is changed.

3. The method of claim 2, wherein the predetermined region is any one of a block composed of one or more Coding Units (CUs) or a block composing of one or more Coding Tree Units (CTUs).

4. The method of claim 1, wherein when there is a plurality of motion information in the motion information list used for the block decoded before decoding for the current block, the generating of the candidate list is performed in such a manner as to include an average of at least two or more motion information of the plurality of motion information in the candidate list.

5. The method of claim 1, wherein when the motion information of the motion information list used for the block decoded before decoding for the current block is the same as the motion information previously included in the candidate list, the generating of the candidate list is performed in such a manner as not to include the motion information of the motion information list in the candidate list.

6. The method of claim 1, wherein when a prediction mode for the current block is an Intra Block Copy (IBC) mode and the candidate list is a shared merge list, the updating of the motion information list is omitted.

7. The method of claim 1, wherein when the number of motion information stored in the motion information list is a predetermined value, the updating of the derived motion information in the motion information list includes deleting the motion information first stored in the motion information list and storing the derived motion information.

8. A method of generating a candidate list of candidates for motion information generated in image encoding, comprising:
    generating the candidate list including motion information generated using information of a neighboring block adjacent to a current block;
    deriving motion information of the current block using the candidate list;
    generating a prediction block of the current block using the derived motion information of the current block; and
    updating a motion information list to store the derived motion information of the current block,
    wherein the candidate list includes at least one of motion information included in the motion information list used for a block encoded before encoding for the current block, and
    wherein the derived motion information for the current block is stored in the motion information list to be used for Intra Block Copy (IBC) mode when a size of the current block is greater than or equal to a first predetermined size and the size is less than or equal to a second predetermined size.

9. The method of claim 8, wherein the motion information list is initialized when encoding of a predetermined region is completed so that the region is changed.

10. The method of claim 9, wherein the predetermined region is any one of a block composed of one or more Coding Units (CUs) or a block composing of one or more Coding Tree Units (CTUs).

11. The method of claim 8, wherein when there is a plurality of motion information in the motion information list used for the block encoded before encoding for the current block, the generating of the candidate list is performed in such a manner as to include an average of at least two or more motion information of the plurality of motion information in the candidate list.

12. The method of claim 8, wherein when the motion information of the motion information list used for the block encoded before encoding for the current block is the same as the motion information previously included in the candidate list, the generating of the candidate list is performed in such a manner as not to include the motion information of the motion information list in the candidate list.

13. The method of claim 8, wherein when a prediction mode for the current block is an Intra Block Copy (IBC)

mode and the candidate list is a shared merge list, the updating of the motion information list is omitted.

14. The method of claim 8, wherein when the number of motion information stored in the motion information list is a predetermined value, the updating of the derived motion information in the motion information list includes deleting the motion information first stored in the motion information list and storing the derived motion information.

15. A non-transitory computer-readable recording medium comprising a bitstream decoded by an image decoding method, the image decoding method comprising:
   generating a candidate list including motion information generated using information of a neighboring block adjacent to a current block;
   deriving motion information of the current block using the candidate list;
   generating a prediction block of the current block using the derived motion information of the current block; and
   updating a motion information list to store the derived motion information of the current block,
   wherein the candidate list includes at least one information of motion information included in the motion information list used for a block decoded before decoding for the current block, and
   wherein the derived motion information for the current block is stored in the motion information list to be used for Intra Block Copy (IBC) mode when a size of the current block is greater than or equal to a first predetermined size and the size is less than or equal to a second predetermined size.

16. A non-transitory computer-readable recording medium storing a bitstream, the bitstream comprising:
   information for a prediction mode,
   wherein prediction for a current block is performed using the information for the prediction mode,
   wherein a candidate list including motion information generated using information of a neighboring block adjacent to a current block is generated,
   wherein motion information of the current block is derived using the candidate list,
   wherein a prediction block of the current block is generated using the derived motion information of the current block,
   wherein a motion information list is updated to store the derived motion information of the current block,
   wherein the candidate list includes at least one information of motion information included in the motion information list used for a block decoded before decoding for the current block, and
   wherein the derived motion information for the current block is stored in the motion information list to be used for Intra Block Copy (IBC) mode when a size of the current block is greater than or equal to a first predetermined size and the size is less than or equal to a second predetermined size.

* * * * *